(12) United States Patent
Rotenberg

(10) Patent No.: US 12,307,399 B1
(45) Date of Patent: *May 20, 2025

(54) SYSTEM AND METHOD OF END-TO-END SUPPLY CHAIN SEGMENTATION

(71) Applicant: JDA Software Group, Inc., Scottsdale, AZ (US)

(72) Inventor: Alexis Rotenberg, Egham (GB)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,108

(22) Filed: Oct. 3, 2017

Related U.S. Application Data

(63) Continuation-in-part of application No. 15/723,554, filed on Oct. 3, 2017, and a continuation-in-part of application No. 15/724,052, filed on Oct. 3, 2017, now abandoned.

(60) Provisional application No. 62/403,576, filed on Oct. 3, 2016.

(51) Int. Cl.
  *G06Q 10/0631* (2023.01)
  *G06Q 10/087* (2023.01)

(52) U.S. Cl.
  CPC ..... *G06Q 10/06315* (2013.01); *G06Q 10/087* (2013.01)

(58) Field of Classification Search
  None
  See application file for complete search history.

(56) References Cited

U.S. PATENT DOCUMENTS

| | | | | |
|---|---|---|---|---|
| 5,953,707 A | * | 9/1999 | Huang | G06Q 10/06315 |
| | | | | 705/7.31 |
| 6,954,734 B1 | * | 10/2005 | Kuelbs | G06Q 10/025 |
| | | | | 705/14.1 |
| 7,574,383 B1 | * | 8/2009 | Parasnis | G06Q 10/06315 |
| | | | | 705/28 |
| 7,925,557 B1 | * | 4/2011 | Ficery | G06Q 40/10 |
| | | | | 705/38 |

(Continued)

FOREIGN PATENT DOCUMENTS

| | | | | |
|---|---|---|---|---|
| WO | WO-0103046 A1 | * | 1/2001 | G06Q 40/06 |

OTHER PUBLICATIONS

Adams J., Creehan K., Sporn J., Balaban R., Santhanam S., Peter J., Key performance levers in your business: The performance improvement priorities of billion dollar CEOs, (2014), Oliver Wyman, pp. 1-12 (Year: 2014).*

(Continued)

*Primary Examiner* — Sara Grace Brown
(74) *Attorney, Agent, or Firm* — Spencer Fane LLP; Steven J. Laureanti

(57) ABSTRACT

A system and method are disclosed for identifying supply chain segmentations from an initially non-segmented supply chain is disclosed. Embodiments of identifying supply chain segmentations includes receiving a current state of items in a supply chain network, wherein an inventory of the one or more supply chain entities is used to store one or more items, organizing one or more supply chain entities into one or more customer-product clusters, associating supply chain strategies for customer-product clusters, and transporting items among one or more supply chain entities.

14 Claims, 17 Drawing Sheets

(56) References Cited

U.S. PATENT DOCUMENTS

| | | | | |
|---|---|---|---|---|
| 8,838,469 | B2* | 9/2014 | Bottom | G06Q 30/0204 705/7.29 |
| 9,576,262 | B2* | 2/2017 | Ganguly | G06Q 10/06375 |
| 10,915,557 | B2* | 2/2021 | Garera | G06F 16/285 |
| 2002/0138336 | A1* | 9/2002 | Bakes | G06Q 10/087 705/28 |
| 2002/0184074 | A1* | 12/2002 | Chen | G06Q 10/06 700/100 |
| 2003/0208468 | A1* | 11/2003 | McNab | G06Q 10/063 |
| 2005/0177435 | A1* | 8/2005 | Lidow | G06Q 10/06 705/22 |
| 2006/0111963 | A1* | 5/2006 | Li | G06Q 10/04 705/7.31 |
| 2008/0249815 | A1* | 10/2008 | Helal | G06Q 30/0206 705/7.42 |
| 2010/0318403 | A1* | 12/2010 | Bottom | G06Q 30/0202 706/54 |
| 2011/0107295 | A1* | 5/2011 | Banavar | G06Q 10/00 717/104 |
| 2012/0042013 | A1* | 2/2012 | Roman | G06Q 10/101 709/204 |
| 2012/0084223 | A1* | 4/2012 | Briet | G06Q 10/08355 705/338 |
| 2012/0253890 | A1* | 10/2012 | Paliwal | G06Q 10/06 705/7.39 |
| 2012/0317059 | A1* | 12/2012 | Joshi | G06Q 10/06 706/12 |
| 2013/0166468 | A1* | 6/2013 | Vogelgesang | G06Q 10/087 705/330 |
| 2014/0068404 | A1* | 3/2014 | Stiffler | G06F 40/174 715/227 |
| 2014/0229243 | A1* | 8/2014 | Singh | G06Q 99/00 705/7.36 |
| 2015/0066569 | A1* | 3/2015 | Ervolina | G06Q 10/06315 705/7.25 |
| 2015/0149257 | A1* | 5/2015 | Bielat | G06Q 10/0637 705/7.36 |
| 2015/0370232 | A1* | 12/2015 | Kohn | G06N 5/04 700/287 |
| 2017/0132553 | A1* | 5/2017 | Theirl | G06F 16/2246 |
| 2017/0140405 | A1* | 5/2017 | Gottemukkala | G06Q 30/0206 |
| 2017/0307387 | A1* | 10/2017 | Kohlhepp | G05B 19/4155 |
| 2018/0075401 | A1* | 3/2018 | Harsha | G06Q 30/0202 |
| 2018/0088586 | A1* | 3/2018 | Hance | G06Q 50/28 |

OTHER PUBLICATIONS

Lee S., Klassen R., "Drivers and Enablers That Foster Environmental Management Capabilities in Small- and Medium-Sized Suppliers in Supply Chains," Nov.-Dec. 2008, Production and Operations Management, vol. 17, No. 6, pp. 573-586 (Year: 2008).*

Marr B., Schiuma G., Neely A., "Intellectual capital—defining key performance indicators for organizational knowledge assets," 2004, Business Process Management Journal vol. 10 No. 5 (Year: 2004).*

Louw, Johannes Jacobus. Advanced supply chain planning processes and decision support systems for large-scale petrochemical companies. 2006. Diss. Stellenbosch: University of Stellenbosch. (Year: 2006).*

Hiremath, N. et al. "Multi objective outbound logistics network design for a manufacturing supply chain," Mar. 29, 2012. J Intell Manuf (2013) 24:1071-1084 (Year: 2012).*

Satoglu, Sule Itir, and Tugce Aslangul. "An Integrated Methodology for Order Dispatching to Distributors." 2014. XII. International Logistics and Supply Chain Congress. (Year: 2014).*

Liang, Catherine Gloria. Segmentation strategies for managing retail supply chains. 2011. Diss. Massachusetts Institute of Technology. (Year: 2011).*

Caldas, Marco AF, Felipe Fernandes Cordeiro, and Joel Arthur Guimarães. "A Marketing-Logistic Appraisal of a Retailer-Distributor Company." 1997. IFAC Proceedings vols. 30.19 (1997): 127-130. (Year: 1997).*

Millstein, Mitchell A., Liu Yang, and Haitao Li. "Optimizing ABC inventory grouping decisions." Feb. 2014. International Journal of Production Economics 148 (2014): 71-80. (Year: 2014).*

* cited by examiner

| S. No. | SC STRATEGIES 502 | DEFAULT 902 | SPECIAL CASE 904 |
|---|---|---|---|
| 1. | ACTIVE DEMAND MANAGEMENT 652 | DEFAULT STRATEGY ICO LEVEL IN SOME CASES IT'S IMPORTANT TO MANAGE FORECAST AT LOWER DETAIL LEVEL | ADDITIONAL EFFORT IS ONLY JUSTIFIED AT PLANNING CCN AND CLUSTER LEVEL WHEN THE OBJECTIVE IS TO PROVIDE BETTER AVAILABILITY AND RELIABILITY FOR SPECIFIC CUSTOMER OR GROUPS |
| 2. | ACTIVE SUPPLY MANAGEMENT 654 | DEFAULT STRATEGY IS FAIR SHARE AMONG ALL ICO'S. CERTAIN CUSTOMER, ARTICLE AND DEMAND TYPE MIGHT REQUIRE TO RE-PRIORITIZE THE DEMAND | OE AND STRATEGIC RE DEMAND SHOULD ALWAYS BE PRIORITIZED. ARTICLE PRIORITIZATION FOR STRATEGIC PRODUCTS |
| 3. | ACTIVE INVENTORY MANAGEMENT 650 | PLANT WH IS DEFAULT INVENTORY STOCKING POINTS. CERTAIN CASES REQUIRE MORE DOWNSTREAM STOCKING OPTIONS SUPPORTED BY DIFFERENT DEPLOYMENT OPTIONS | SPECIFIC RETAIL BUSINESS REQUIRES DOWNSTREAM INVENTORY TO ENSURE AD-HOC AVAILABILITY. SAFETY STOCK DEPEND UPON CUSTOMER SERVICE TARGET AND RISK MANAGEMENT |
| 4. | ACTIVE AATP MANAGEMENT 658 | DEFAULT STRATEGY IS ICO LEVEL ALLOCATION AND LIMITED PROTECTION. CERTAIN CASES REQUIRE ALLOCATION TO BE MANAGED AT LOWER DETAIL LEVEL AND CONSUMPTION RESTRICTIONS | ALLOCATION AT CUSTOMER LEVEL FOR STRATEGIC CUSTOMERS ALLOW PRIORITY CUSTOMER TO CONSUME OWN AND OTHER ALLOCATIONS |
| 5. | ACTIVE SHIPMENT MANAGEMENT 660 | DEFAULT STRATEGY IS MIX OF PLANT AND RDC SHIPMENT WITH STANDARD DELIVERY OPTION. CERTAIN CASES PROVIDE OPPORTUNITY FOR DS (LOAD CONSOLIDATION). SOME CASES REQUIRE EXPEDITE OPTION | PREMIUM SERVICE [PARCEL SERVICE] FOR VERY SHORT LEAD TIMES HUB CONCEPT DS FOR COMMODITY, WHOLESALE WHERE COST IS CRITICAL |
| 6. | ACTIVE PRODUCTION MANAGEMENT 656 | DEFAULT STRATEGY IS MTS. FOR CERTAIN LIST OF ARTICLES IT'S AN EFFICIENT APPROACH TO PLAN MTO | COMMODITY ARTICLES REQUIRES MAKE TO ORDER BASED PLANNING |

FIG. 9

| STRATEGIES 502 | LEVER 504 | CONFIGURATION OPTIONS 508 | | OWNER 1002 |
|---|---|---|---|---|
| | | BY SYSTEM CONFIGURATION | BY GOVERNANCE RULES | |
| ACTIVE DEMAND MANAGEMENT 652 | FORECAST LEVEL 442 | ICO/CLUSTER/ PLANNING CCN | | CENTRAL AND MARKET |
| ACTIVE INVENTORY MANAGEMENT 650 | STOCKING STRATEGY 446 | | UPSTREAM - HIGH AND DOWNSTREAM - LOW/ UPSTREAM - LOW AND DOWNSTREAM - HIGH/ NONE | CENTRAL (PLANT AND MARKET) |
| ACTIVE SUPPLY MANAGEMENT 654 | DEMAND PRIORITIZATION 444 | ICO FAIR SHARE/ CLUSTER PRIORITY | | CENTRAL |
| ACTIVE PRODUCTION MANAGEMENT 656 | PRODUCTION RULE 448 | | MTS/MTO | CENTRAL AND PLANT |
| ACTIVE AATP MANAGEMENT 658 | ATP ALLOCATION 450 | ICO/CLUSTER/ PLANNING CCN | | CENTRAL AND MARKET |
| ACTIVE SHIPMENT MANAGEMENT 660 | DELIVERY STRATEGY 1004 | | DS-FTL/DS-LTL/ RDC/EXPEDITE | MARKET AND PLANT |

FIG. 10

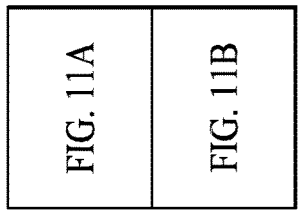

FIG. 11

| FIG. 11A |
|----------|
| FIG. 11B |

FIG. 11A

| 502 SC STRATEGY | 504 SC LEVER | 508 CONFIGURATION OPTIONS | 1102 STRATEGIC SC MODEL | 1104 COLLABORATIVE SC MODEL | 1106 AGILE SC MODEL | 1108 RESPONSIVE SC MODEL | 1110 EFFICIENT SC MODEL |
|---|---|---|---|---|---|---|---|
| ACTIVE DEMAND MANAGEMENT 652 | FORECAST LEVEL 442 | ICO/CLUSTER/ PLANNING CCN | CLUSTER OR PLANNING CCN | PLANNING CCN | CLUSTER | ICO | ICO |
| ACTIVE INVENTORY MANAGEMENT 650 | STOCKING STRATEGY GUIDELINES 446 | UPSTREAM – HIGH AND DOWNSTREAM – LOW/ UPSTREAM – LOW AND DOWNSTREAM – HIGH/ NONE | INHERITED FROM PREVIOUS SC MODEL | AS PER CUSTOMER SLA | DOWNSTREAM – HIGH AND UPSTREAM – LOW | DOWNSTREAM – LOW AND UPSTREAM – HIGH | NONE |

TO FIG. 11B

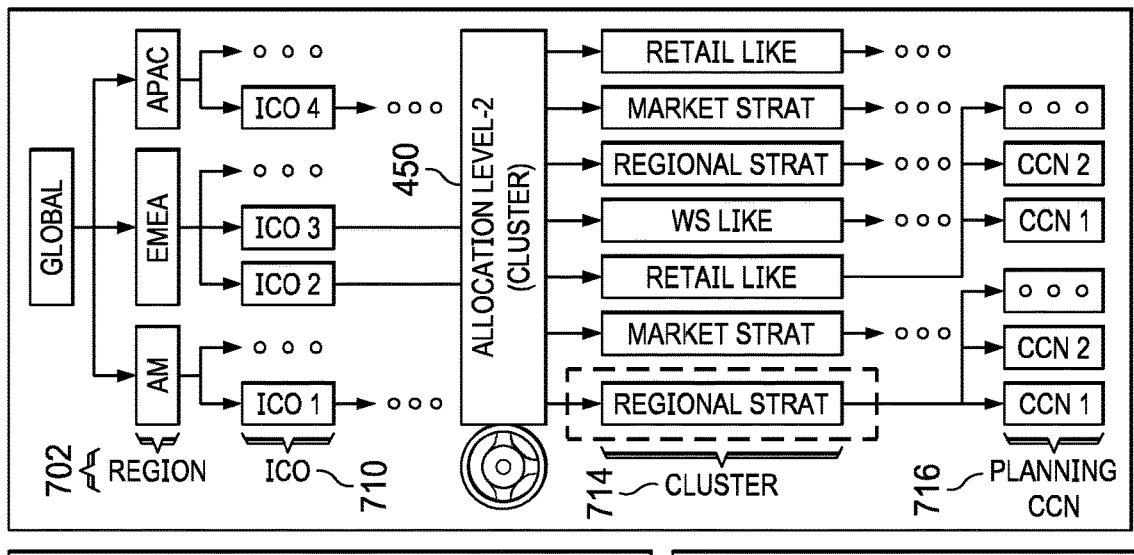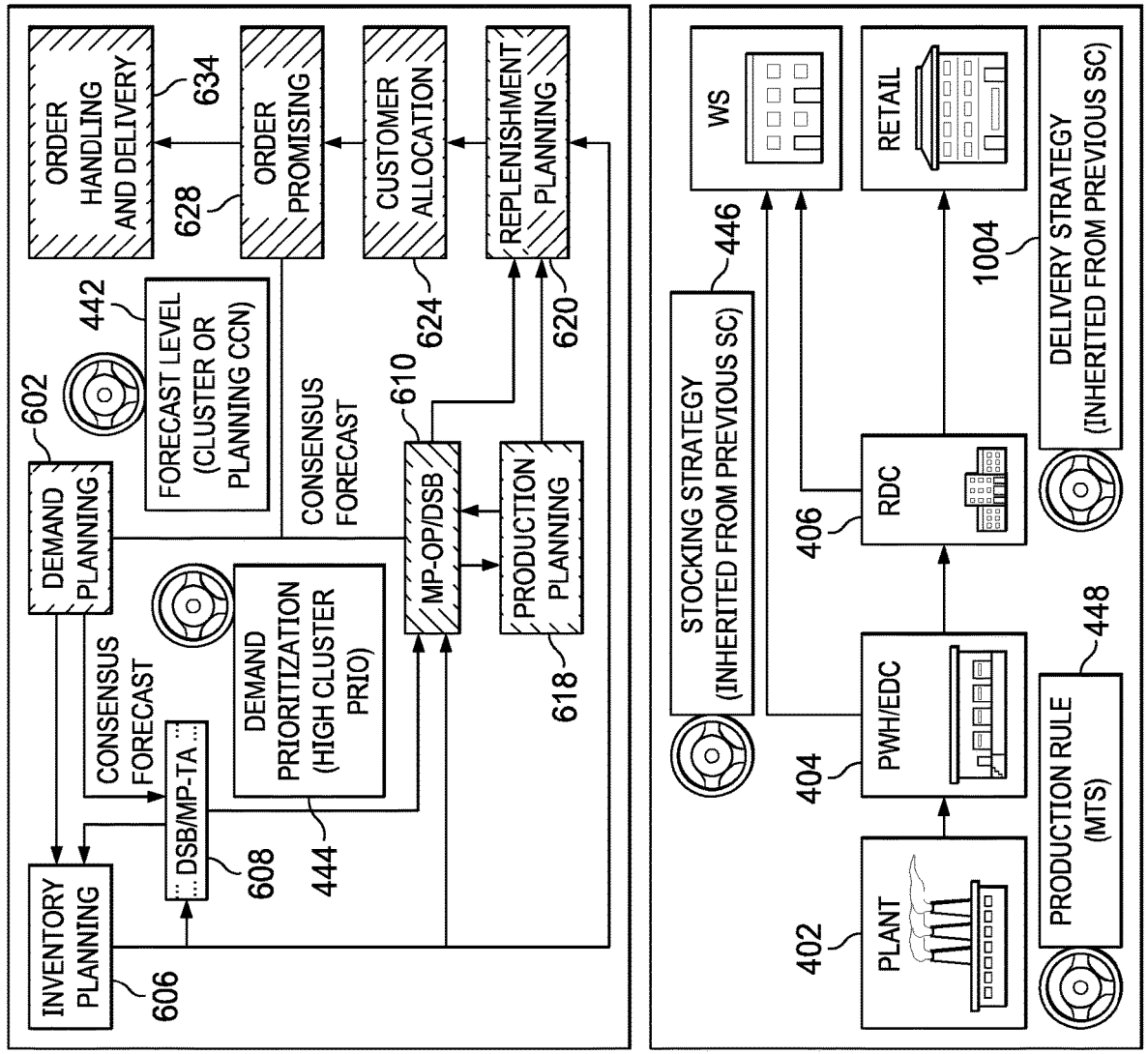
FIG. 12

FIG. 17

| SC STRATEGIES 502 | SC LEVER 504 | CENTRAL STEERING CDM/CSM 706 | MARKET STEERING MDM 708 |
|---|---|---|---|
| ACTIVE DEMAND MANAGEMENT 652 | FORECAST LEVEL 442 | • FORECAST MANAGEMENT OF CENTRAL CLUSTER | • FORECAST MANAGEMENT OF MARKET CLUSTER<br>• ENABLE CUSTOMER COLLABORATION |
| ACTIVE INVENTORY MANAGEMENT 650 | STOCKING STRATEGY GUIDELINES 446 | • PWH STOCK MANAGEMENT<br>• PLANT SAFETY STOCK DECISION<br>• RISK AND OPPORTUNITY PLANNING<br>• PREBUILD STOCK PLANNING | • RDC STOCK MANAGEMENT<br>• RDC SAFETY STOCK DECISION<br>• CYCLE STOCK (REPLENISHMENT STRATEGY DECISION)<br>• DELIVERY – DS/RDC/EXPEDITE/FTL/LTL OPTION |
| ACTIVE SUPPLY MANAGEMENT 654 | DEMAND PRIORITIZATION 444 | • MP PRIORITY FOR DIFFERENT SC MODEL<br>• ARTICLE PRIORITY | • NONE |
| ACTIVE PRODUCTION MANAGEMENT 656 | PRODUCTION RULE GUIDELINES 448 | • PREBUILD DECISION<br>• MTO DECISION<br>• CAPACITY DECISION | • NONE |
| ACTIVE SHIPMENT MANAGEMENT 660 | DELIVERY STRATEGY GUIDELINES 1004 | • NONE | • CHOOSE BETWEEN DS, FTL, LTL, EXPEDITE |
| ACTIVE AATP MANAGEMENT 658 | ATP ALLOCATION 450 | • REGIONAL STRATEGIC CUSTOMER CLUSTER ALLOCATION | • ATP ALLOCATION TO DIFFERENT CUSTOMER/CLUSTER WITHIN MARKET<br>• AATP CONSUMPTION RULES WITHIN MARKET |

1700

SYSTEM AND METHOD OF END-TO-END SUPPLY CHAIN SEGMENTATION

CROSS-REFERENCE TO RELATED APPLICATIONS

This application is a continuation-in-part of U.S. patent application Ser. No. 15/724,052, filed on Oct. 3, 2017, entitled "System and Method of End-to-End Supply Chain Segmentation," which is a continuation-in-part of U.S. patent application Ser. No. 15/723,554, filed on Oct. 3, 2017, entitled "System and Method of End-to-End Supply Chain Segmentation," which claims the benefit under 35 U.S.C. § 119 (e) to U.S. Provisional Application No. 62/403,576, filed Oct. 3, 2016, and entitled "System and Method of End-to-End Supply Chain Segmentation." U.S. patent application Ser. Nos. 15/723,554, 15/724,052 and U.S. Provisional Application No. 62/403,576 are assigned to the assignee of the present application. The subject matter disclosed in U.S. patent application Ser. Nos. 15/723,554, 15/724,052 and U.S. Provisional Application No. 62/403,576 is hereby incorporated by reference into the present disclosure as if fully set forth herein.

TECHNICAL FIELD

The present disclosure relates generally to supply chain segmentation and specifically to a system and method of segmenting a supply chain network based on customer and product attributes.

BACKGROUND

Many companies struggle to differentiate service to customers for their products in a consistent way. Standard supply chain processes, combined with a multitude of customers and products, make it difficult to deliver special services without workarounds in order-taking and planning systems. Determining how deep and granular service differentiation should be is difficult because having too much leads to complexity, while having too little does not differentiate a service offering sufficiently. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 9 illustrates supply chain strategies selected to differentiate supply chain models, according to an embodiment;

FIG. 10 illustrates supply chain levers associated with various supply chain strategies and configuration options, according to an embodiment;

FIG. 12 illustrates configuration options for levers for a strategic supply chain model, according to an embodiment;

FIG. 17 illustrates a chart detailing the relationship between supply chain strategies, levers, and supply chain strategy steering.

DETAILED DESCRIPTION

Figure 1:
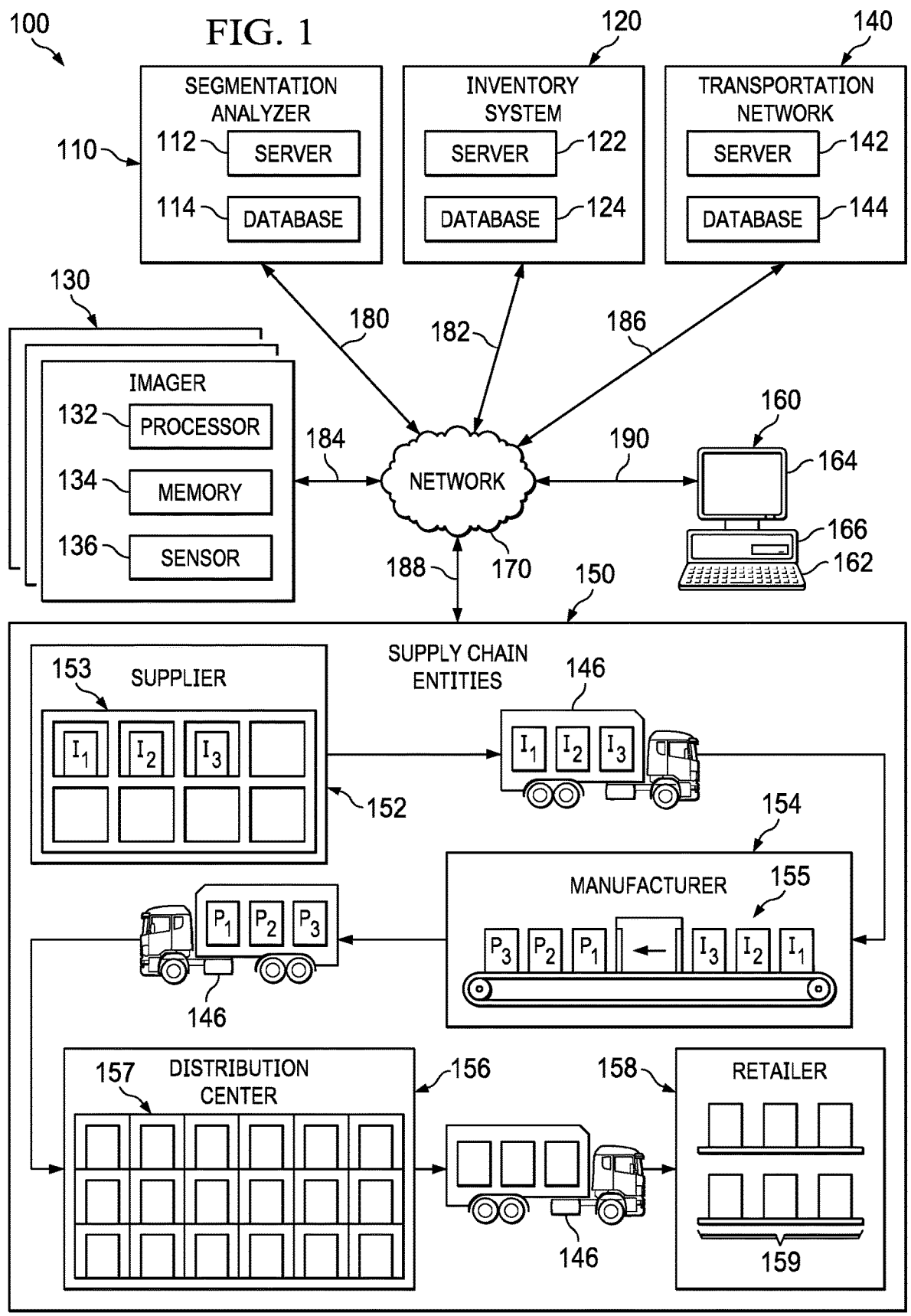
FIG. 1 illustrates an exemplary supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

One of the reasons companies struggle with creating differentiated services is because service offerings are a multi-dimensional problem dependent on competing priorities. Customers have different service priorities (e.g. higher fill rates at a premium price, extra services, stripped-down services, and the like) while also having different cost priorities (e.g. service package cost and the like). These challenges make it difficult to design a supply chain that offers consistent service to groups of customers.

Supply chain segmentation may aid companies to meet the needs of customers by customizing services to the customers' attributes, which often vary greatly. According to some embodiments, segmentation may be implemented in the logistics-phase of supply chain management by providing different package sizes and package assortments to customer with different shelf requirements. For example, a beauty care products distributor could send a large box of a single type of shampoo to a big-box retailer but send a smaller box containing an assortment of beauty care products to a mom-and-pop store with limited shelf and storage space. According to a further example, a vehicle manufacturer may set up additional production lines to meet the needs of customers that desire customization of the vehicle without slowing down a production line that produces fully-standard vehicles. For example, a vehicle manufacturer could create three production lines that run parallel to each other: a first production line for fully-customized vehicles, a second production line for slightly-customized vehicles, and a third production line for fully-standard vehicles. In this way, the service requirements of each customers' needs may be met without significant impact to other customers.

These segmentation techniques do not, however, indicate how to segment customers, how many segments to create, the characteristics of each segment, or how to implement the segments into a supply chain. In addition, these supply chain segmentation techniques use technical parameters, such as demand variability or profitability, but cannot tie back to customer service requirements, nor validate why the segmentation was based on certain parameters and not on others. The supply chain models created by these segmentation techniques are loosely defined and derived typically from product characteristics. No consistent approach exists to segment a supply chain and define the supply chain models' relationship to customer service objectives.

According to embodiments, embodiments of the current disclosure comprise resolving priority conflicts across a segmented supply chain, defining clusters of customers and products, and determining particular implementations of demand planning, supply and distribution planning, inventory management, allocation planning, and order fulfilment. According to embodiments, customers and products may be classified to directly configure service priorities in segmented supply chain management planning and execution modules.

According to a further aspect, embodiments of the current disclosure comprise mapping customer clusters, product clusters, customer-product clusters, and/or customer business models to supply chain models. These mappings are complicated by the fact that all customers may potentially order all products and not all customers may want the same service for all products that they order. Additionally, the particular supply chain function that is being performed may shift the priority from customer to product, or vice versa. For example, the closer the supply chain functions are to the market side of the supply chain (such as logistics), the more likely a customer dimension will be prioritized. However, as the supply chain functions are closer to the factories and the suppliers of raw material, the more likely a product dimension will be prioritized.

FIG. 1 illustrates exemplary supply chain network 100 according to a first embodiment. Supply chain network 100 comprises segmentation analyzer 110, inventory system 120, one or more imagers 130, transportation network 140, one or more supply chain entities 150, computer 160, network 170, and communication links 180-190. Although a single segmentation analyzer 110, a single inventory system 120, one or more imagers 130, a single transportation network 140, one or more supply chain entities 150, a single computer 160, and a single network 170, are shown and described, embodiments contemplate any number of segmentation analyzers, inventory systems, imagers, transportation systems, supply chain entities, computers, or networks, according to particular needs.

In one embodiment, segmentation analyzer 110 comprises server 112 and database 114. According to embodiments, server 112 comprises one or more modules for segmenting supply chains according to various approaches. For example, and as discussed in more detail below, the one or more modules define supply chain models based, at least in part, on customer business models, KPI trade-offs, and supply chain characteristics. In addition, these one or more modules define clusters of customers and products and determines particular implementations of demand planning, supply and distribution planning, inventory management, allocation planning, and order fulfilment. Furthermore, the one or more modules configure supply chain processes with levers, enablers, and configuration options to enforce one or more supply chain models to customers, products, or customer-product clusters. Each of these modules will be discussed in more detail below.

Inventory system 120 comprises server 122 and database 124. Server 122 of inventory system 120 is configured to receive and transmit item data, including item identifiers, pricing data, attribute data, inventory levels, and other like data about one or more items at one or more locations in the supply chain network 100. Server 122 stores and retrieves item data from database 124 or from one or more locations in supply chain network 100.

One or more imagers 130 comprise an electronic device that receives imaging information from one or more sensors 136 or from one or more databases in supply chain network 100. According to embodiments, one or more imagers 130 comprise one or more processors 132, memory 134, one or more sensors 136, and may include any suitable input device, output device, fixed or removable computer-readable storage media, or the like. According to embodiments, one or more imagers 130 identify items near one or more sensors 136 and generate a mapping of the item in supply chain network 100. As explained in more detail below, inventory system 120 and transportation network 140 use the mapping of an item to locate the item in supply chain network 100. The location of the item is then used to coordinate the storage and transportation of items in supply chain network 100 to implement one or more prioritizations, hierarchies, and/or supply chain models generated by segmentation analyzer 110.

One or more imagers 130 may comprise a mobile handheld device such as, for example, a smartphone, a tablet computer, a wireless device, or the like. In addition, or as an alternative, one or more imagers 130 comprise one or more networked electronic devices configured to transmit item identity information to one or more databases as an item passes by or is scanned by one or more imagers 130. This may include, for example, a stationary scanner located at one or more supply chain entities 150 that identifies items as the items pass near the scanner. One or more sensors 136 of one or more imagers 130 may comprise an imaging sensor, such as, a camera, scanner, electronic eye, photodiode, charged coupled device (CCD), or any other electronic or manual sensor that detects images of objects. In addition, or as an alternative, one or more sensors 136 may comprise a radio receiver and/or transmitter configured to read an electronic tag, such as, for example, a radio-frequency identification (RFID) tag. In addition, or as an alternative, each of the one or more items may be represented in supply chain network 100 by an identifier, including, for example, Stock-Keeping Unit (SKU), Universal Product Code (UPC), serial number, barcode, tag, RFID, or any other object that encodes identifying information. As discussed above, one or more imagers 130 may generate a mapping of one or more items in the supply chain network 100 by scanning an identifier or object associated with an item and identifying the item based, at least in part, on the scan.

Transportation network 140 comprises server 142 and database 144. According to embodiments, transportation network 140 directs one or more transportation vehicles 146 to ship one or more items between one or more supply chain entities 150, based, at least in part, on the one or more prioritizations, hierarchies, and/or supply chain models generated by segmentation analyzer 110. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with segmentation analyzer 110, inventory system 120, one or more imagers 130, transportation network 140, and/or one or more supply chain entities 150 to identify the location of the transportation vehicle 146 and the location of any inventory or shipment located on the transportation vehicle 146. In addition to the supply chain models, the number of items shipped by transportation vehicles 146 in transportation network 140 may also be based, at least in part, on the number of items currently in stock at one or more supply chain entities 150, the number of items currently in transit in the transportation network 140, forecasted demand, a supply chain disruption, or the like.

As shown in FIG. 1, supply chain network 100 operates on one or more computers 160 that are integral to or separate from the hardware and/or software that support segmentation analyzer 110, inventory system 120, one or more imagers 130, transportation network 140, and one or more supply chain entities 150. Supply chain network 100 comprising segmentation analyzer 110, inventory system 120, one or more imagers 130, transportation network 140, and one or more supply chain entities 150 may operate on one or more computers that are integral to or separate from the hardware and/or software that support segmentation analyzer 110, inventory system 120, one or more imagers 130, transportation network 140, and one or more supply chain entities 150. Computers 160 may include any suitable input device 162, such as a keypad, mouse, touch screen, microphone, or other device to input information. Output device 164 may convey information associated with the operation of supply chain network 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to supply chain network 100.

Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein. According to some embodiments, the functions and methods described in connection with one or more imagers 130 may be emulated by one or more modules configured to perform the functions and methods as described.

In addition, and as discussed herein, supply chain network 100 may comprise a cloud-based computing system having processing and storage devices at one or more locations, local to, or remote from segmentation analyzer 110, inventory system 120, one or more imagers 130, transportation network 140, and one or more supply chain entities 150. In addition, each of the one or more computers 140 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the inventory planer 110, inventory system 120, one or more imagers 130, transportation network 140, and one or more supply chain entities 150.

These one or more users may include, for example, a "manager" or a "planner" handling supply chain segmentation and/or one or more related tasks within the system. In addition, or as an alternative, these one or more users within the system may include, for example, one or more computers programmed to autonomously handle, among other things, one or more supply chain processes such as demand planning, supply and distribution planning, inventory management, allocation planning, order fulfilment, and adjustment of manufacturing and inventory levels at various stocking points and distribution centers, and/or one or more related tasks within supply chain network 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on one or more prioritizations, hierarchies, and/or supply chain models determined by segmentation analyzer 110 and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in supply chain network 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on one or more prioritizations, hierarchies, and/or supply chain models determined by segmentation analyzer 110 and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in supply chain network 100 and store and transport the product for a second one or more supply chain entities 150. Distribution centers 156 may comprise automated warehousing systems 157 that automatically remove products from and place products into inventory based, at least in part, one or more prioritizations, hierarchies, and/or supply chain models determined by segmentation analyzer 110 and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158.

Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a supply chain network 100 is shown and described, embodiments contemplate any configuration of supply chain network 100, without departing from the scope described herein.

In one embodiment, segmentation analyzer 110 may be coupled with network 170 using communications link 180, which may be any wireline, wireless, or other link suitable to support data communications between segmentation analyzer 110 and network 170 during operation of supply chain network 100. Inventory system 120 may be coupled with network 170 using communications link 182, which may be any wireline, wireless, or other link suitable to support data communications between inventory system 120 and network 170 during operation of supply chain network 100. One or more imagers 130 are coupled with network 170 using communications link 184, which may be any wireline, wireless, or other link suitable to support data communications between one or more imagers 130 and network 170 during operation of distributed supply chain network 100. Transportation network 140 may be coupled with network 170 using communications link 186, which may be any wireline, wireless, or other link suitable to support data communications between transportation network 140 and network 170 during operation of supply chain network 100. One or more supply chain entities 150 may be coupled with network 170 using communications link 188, which may be any wireline, wireless, or other link suitable to support data communications between one or more supply chain entities 150 and network 170 during operation of supply chain network 100. Computer 160 may be coupled with network 170 using communications link 190, which may be any wireline, wireless, or other link suitable to support data communications between computer 160 and network 170 during operation of supply chain network 100.

Although communication links 180-190 are shown as generally coupling one or segmentation analyzer 110, inventory system 120, one or more imagers 130, transportation network 140, one or more supply chain entities 150, and computer 160 to network 170, any of segmentation analyzer 110, inventory system 120, one or more imagers 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling segmentation analyzer 110, inventory system 120, one or more imagers 130, transportation network 140, one or more supply chain entities 150, and computer 160. For example, data may be maintained locally to, or externally of, segmentation analyzer 110, inventory system 120, one or more imagers 130, transportation network 140, one or more supply chain entities 150, and computer 160 and made available to one or more associated users of segmentation analyzer 110, inventory system 120, one or more imagers 130, transportation network 140, one or more supply chain entities 150, and computer 160 using network 170 or in any other appropriate manner. For example, data may be maintained in a cloud database at one or more locations external to segmentation analyzer 110, inventory system 120, one or more imagers 130, transportation network 140, one or more supply chain entities 150, and computer 160 and made available to one or more associated users of segmentation analyzer 110, inventory system 120, one or more imagers 130, transportation network 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, segmentation analyzer 110 may generate one or more prioritizations, hierarchies, and/or supply chain models that determine the routing, storage, and handling for the inventory of one or more supply chain entities 150 in supply chain network 100. Additionally, segmentation analyzer 110, inventory system 120, imagers 130, transportation network 140, and/or one or more supply chain entities 150 may comprise a server and database comprising one or more modules to perform one or more planning and execution processes including demand planning processes, supply planning processes, demand fulfillment processes, an order entry system, comprising an order entry process, an allocation-planning order promising (AP-OP) engine, and the like, as described in more detail below. Furthermore, segmentation analyzer 110, inventory system 120, and/or transportation network 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of products based on one or more prioritizations, hierarchies, and/or supply chain models generated by segmentation analyzer 110, plans and policies and/or current inventory or production levels.

For example, the methods described herein may include computers receiving product data from automated machinery having at least one sensor and the product data corresponding to an item detected by one or more imagers 130 of the automated machinery. The received product data may include an image of the item, an identifier, as described above, and/or other product data associated with the item (dimensions, texture, estimated weight, and any other like data). The method may further include computers looking up the received product data in a database system associated with segmentation analyzer 110, inventory system 120, one or more imagers 130, and/or transportation network 140 to identify the item corresponding to the product data received from the automated machinery.

The computers may also receive, from the automated machinery, a current location of the identified item. Based on the identification of the item, computers may also identify (or alternatively generate) a first mapping in the database system, where the first mapping is associated with the current location of the item. Computers may also identify a second mapping in the database system, where the second mapping is associated with a past location of the identified item. Computers may also compare the first mapping and the second mapping to determine if the current location of the identified item in the first mapping is different than the past location of the identified item in the second mapping. Computers may then send instructions to the automated machinery based, as least in part, on one or more differences between the first mapping and the second mapping such as, for example, to locate item to add to or remove from an inventory of or shipment for one or more supply chain entities 150. In addition, or as an alternative, segmentation analyzer 110 monitors KPIs at one or more supply chain entities 150 and adjusts the orders and/or inventory of the one or more supply chain entities 150 based on the KPIs, one or more prioritizations, hierarchies, and/or supply chain models.

Figure 2:
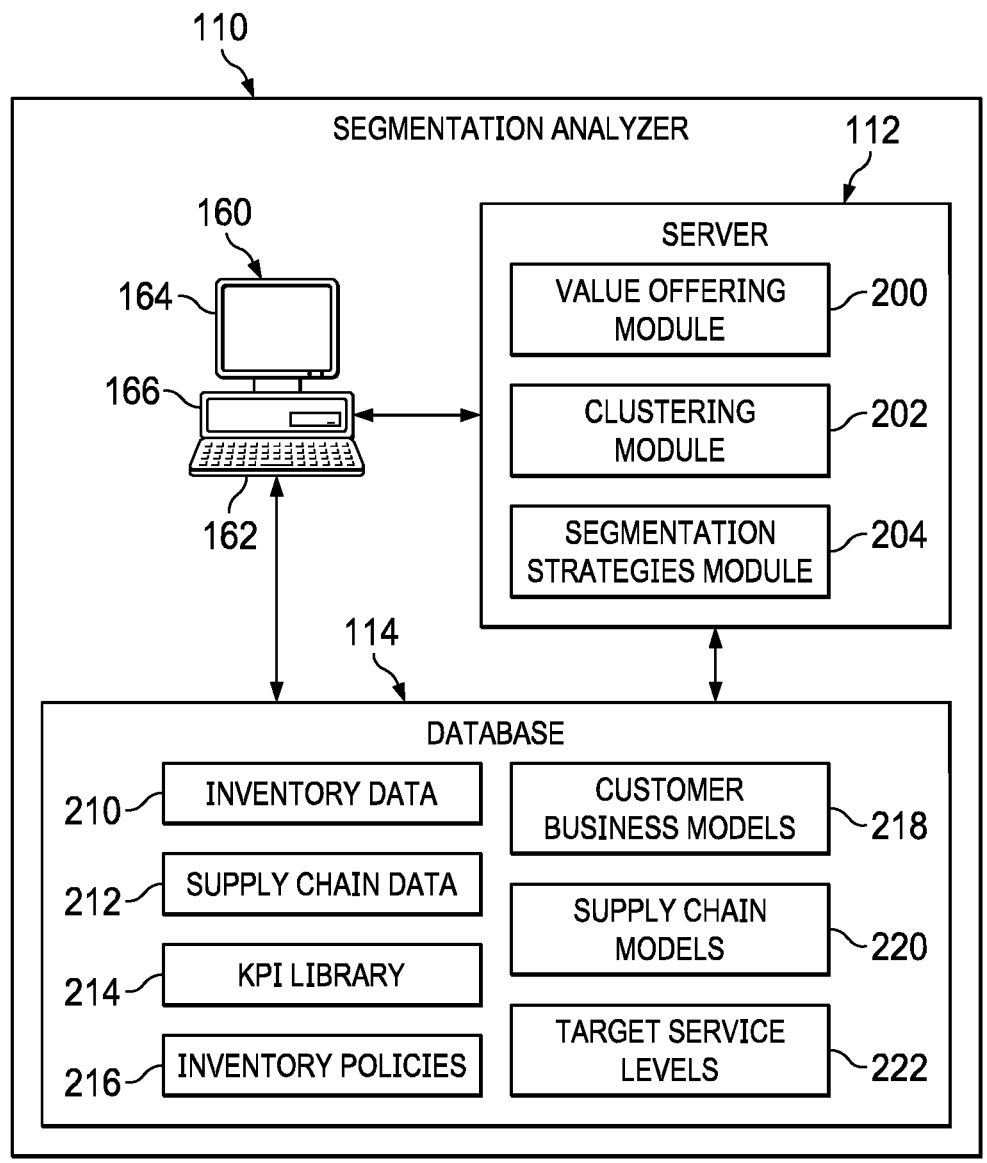
FIG. 2 illustrates the segmentation analyzer of FIG. 1 in greater detail, according to an embodiment.

FIG. 2 illustrates segmentation analyzer 110 of FIG. 1 in greater detail, according to an embodiment. As discussed above, segmentation analyzer 110 may comprise one or more computers 160 at one or more locations including associated input devices 162, output devices 164, non-transitory computer-readable storage media, processors 166, memory, or other components for receiving, processing, storing, and communicating information according to the operation of supply chain network 100. Additionally, segmentation analyzer 110 comprises server 112 and database 114. Although segmentation analyzer 110 is shown as comprising a single computer 160, a single server 112 and a single database 114, embodiments contemplate any suitable number of computers, servers, or databases internal to or externally coupled with segmentation analyzer 110. According to some embodiments, segmentation analyzer 110 may be located internal to one or more retailers 158 of one or more supply chain entities 150. In other embodiments, segmentation analyzer 110 may be located external to one or more retailers 158 of one or more supply chain entities 150 and may be located in for example, a corporate headquarters of the one or more retailers 158, according to particular needs.

Server 112 of segmentation analyzer 110 may comprise value offering module 200, clustering module 202, and segmentation strategies module 204. Value offering module 200 may define supply chain models based, at least in part, on customer business models, KPI trade-offs, and supply chain characteristics. According to embodiments, value offering module 200 identifies the number and type of supply chain models with specific service packages that meet customer and product priorities and which are aligned with the customers' and company's objectives. According to these embodiments, value offering module 200 avoids overly complex customizations of other segmentation approaches by generating a particular number of supply channels with the same number of specific customizations that meet all the needs of the company, instead of a one-size-fits-all solution. According to some embodiments, each of the customizations include particular configurations of supply chain processes or user interfaces that support the supply channel.

Embodiments of clustering module 202 define customer clusters, product clusters, and customer-product combination clusters (customer-product clusters), map customer clusters, product clusters, customer-product clusters, and/or customer business models to supply chain models, and automatically configure particular implementations of demand planning, supply and distribution planning, inventory management, allocation planning, and order fulfilment, including resolving priority conflicts across a segmented supply chain. According to embodiments, clustering module 202 classifies customers and products, combining Pareto analysis and leveraging different dimensions, to directly reflect different service priorities in the design and configuration of segmented supply chain planning and execution modules. Clustering module 202 may embed the cluster definitions in the segmented supply chain planning and execution modules by a customer view of a user interface.

Segmentation strategies module 204 configures supply chain processes with levers, enablers, and configuration options to enforce one or more supply chain models to customers, products, or customer-product clusters, as described in more detail below.

Although server 112 is shown and described as comprising a single value offering module 200, a single clustering module 202, and a single segmentation strategies module 204, embodiments contemplate any suitable number or combination of these located at one or more locations, local to, or remote from segmentation analyzer 110, such as on multiple servers or computers at any location in supply chain network 100.

Database 114 of segmentation analyzer 110 may comprise one or more databases or other data storage arrangement at one or more locations, local to, or remote from, server 112. Database 114 comprises, for example, inventory data 210, supply chain data 212, KPI library data 214, inventory policies 216, customer business models 218, supply chain models 220, and target service levels 222. Although, database 114 is shown and described as comprising inventory data 210, supply chain data 212, KPI library data 214, inventory policies 216, customer business models 218, supply chain models 220, and target service levels 222, embodiments contemplate any suitable number or combination of these, located at one or more locations, local to, or remote from, segmentation analyzer 110 according to particular needs.

Inventory data 210 of database 114 may comprise any data relating to current or projected inventory quantities or states. For example, inventory data 210 may comprise the current level of inventory for each item at one or more stocking points across supply chain network 100. In addition, inventory data 210 may comprise order rules that describe one or more rules or limits on setting an inventory policy, including, but not limited to, a minimum order quantity, a maximum order quantity, a discount, and a step-size order quantity, and batch quantity rules. According to some embodiments, segmentation analyzer 110 accesses and stores inventory data 210 in database 114, which may be used by segmentation analyzer 110 to place orders, set inventory levels at one or more stocking points, initiate manufacturing of one or more components, or the like. In addition, or as an alternative, inventory data 210 may be updated by receiving current item quantities, mappings, or locations from inventory system 120, one or more imagers 130, and/or transportation system 140.

Supply chain data 212 may comprise any data of the one or more supply chain entities 150 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 150. KPI library 214 comprises one or more KPIs that are currently measured by the company and/or KPIs that may be measured by the company with existing IT solutions with consideration given to the objectives of any ongoing business transformation projects. According to embodiments, KPIs in KPI library 214 are identified from a standard reference framework for supply chain processes such as those from, for example, the Supply Chain Operational Reference Model (SCOR), American Production and Inventory Control Society (APICS), American Quality and Productivity Centre (AQPC), or the Gartner KPI framework. Although particular frameworks have been identified, embodiments contemplate any suitable framework or standards, according to particular needs.

Inventory policies 216 of database 114 may comprise any suitable inventory policy describing the reorder point and target quantity, or other inventory policy parameters that set rules for segmentation analyzer 110 to manage and reorder inventory based, at least in part, on customer business models, KPI trade-offs, and supply chain characteristics. According to embodiments, inventory policies 216 may be used by segmentation analyzer 110 to determine a no-stockout probability, fill rate, cost, or other like determination, as described below.

Customer business models 218 comprise groups of customers, channels, and/or product concepts based on one or more customer attributes. As explained in more detail below, customer business models may comprise groups which share a particular set of customer attributes. These customer attributes may include, for example, ordering behavior, order pattern, leadtime expectations, product or packaging adjustments, and unique or particular service requests. More particular examples of customer attributes include: having limited or no storage space, requesting one or more suppliers 152 to keep consignment inventory, selling products from a competitor, purchasing items ahead of season, and placing large orders.

Supply chain models 220 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 220 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Target service level data 222 of database 114 may be calculated by segmentation analyzer 110 from a forecasted demand to ensure that a service level of one or more supply chain entities 150 is met with a certain probability. Target service level data 222 may comprise any suitable service level target. According to some embodiments, one or more supply chain entities 150 set a service level at 95%, meaning the one or more supply chain entities 150 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, segmentation analyzer 110 may determine a replenishment order according to one or more replenishment rules, which, among other things, indicates to one or more supply chain entities 150 to determine or receive inventory to replace the depleted inventory.

Figure 3:
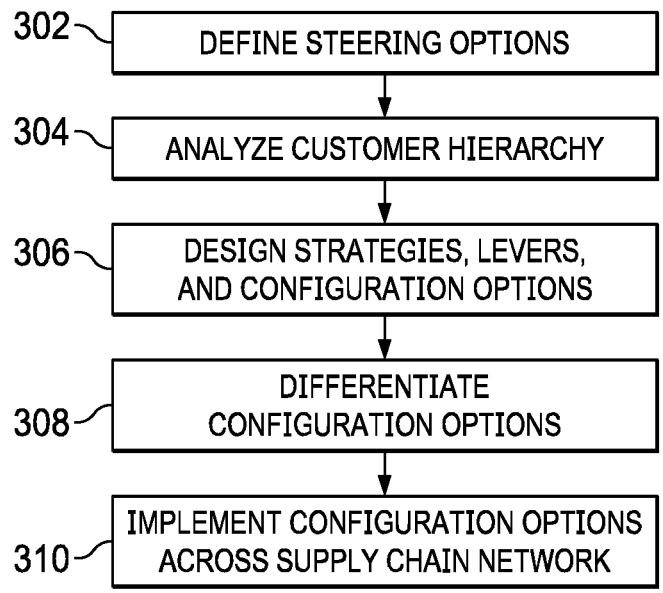
FIG. 3 illustrates an exemplary segmentation strategies method of the segmentation strategies module of the segmentation analyzer of FIG. 2, according to an embodiment.

FIG. 3 illustrates exemplary segmentation strategies method 300 of segmentation strategies module 204 of segmentation analyzer 110, according to an embodiment. Segmentation strategies method 300 comprises one or more activities, which although described in a particular order may be performed in one or more permutations, according to particular needs.

After determining the number and type of supply chains, as described in connection with value offering module 200 and mapping customer clusters, product clusters, customer-product clusters, and/or customer business models to supply chain models, as described in connection with clustering module 202, segmentation strategies module 204 may perform segmentation strategies method 300 to provide an end-to-end approach to configure and directly reflect different service priorities in different supply chain planning modules differentiating both the solution design and configuration of each module. According to embodiments, segmentation strategies method 300 determines configurations that will support a supply chain process that can handle the different characteristics required to support the supply chain models defined by the value offering module 200 and associated with product-customer associations by the clustering module 202. Additionally, or in the alternative, segmentation strategies module 204 automatically configures the supply chain management planning and execution modules to make the supply chain "Agile," "Collaborative," "Efficient Collaborative," "Productive," or "Responsive" for particular products and customers, according to the customer hierarchy and prioritization grid generated by clustering module 202.

At action 302, segmentation strategies module 204 defines steering options. At action 304, segmentation strategies module analyzes customer hierarchy to determine forecast and allocation level for customers, products, and customer-product combinations. At action 306, segmentation strategies module 204 designs strategies, levers, and configuration options. At action 308, segmentation strategies module 204 differentiates configuration options for each by supply chain model. Segmentation strategies module 204 defines which configuration options will differentiate the service and provide differentiated costs to each of these customer-product combinations.

At action 310, segmentation strategies module 204 implements the configuration options across the supply chain network. For example, based on the supply chain models, the supply chain may be altered from a single static supply chain to more than one active supply chains that require, for example, changing the hierarchy and priority of customers and products or the transportation of the products. In addition, embodiments of segmentation strategies module 204 may alter one or more modules of supply chain planning and execution processes, end-to-end, beginning with, for example, demand planning and ending with, for example, order promising. This may include, for example, altering and configuring all planning processes and execution processes differently, including implementing levers 504 (FIG. 5) for each supply chain model.

Each of the actions of the clustering method 300 are explained in more detail below.

1. Defining Steering Options

At action 302, segmentation strategies module 204 may define steering options. According to embodiments, steering options are defined based, at least in part, on one or more performance radars, which may be determined by value offering module 200 and derived from one or more supply chain models. Steering options determine how service priorities may be achieved across the various supply chain planning and execution modules.

Figure 4:
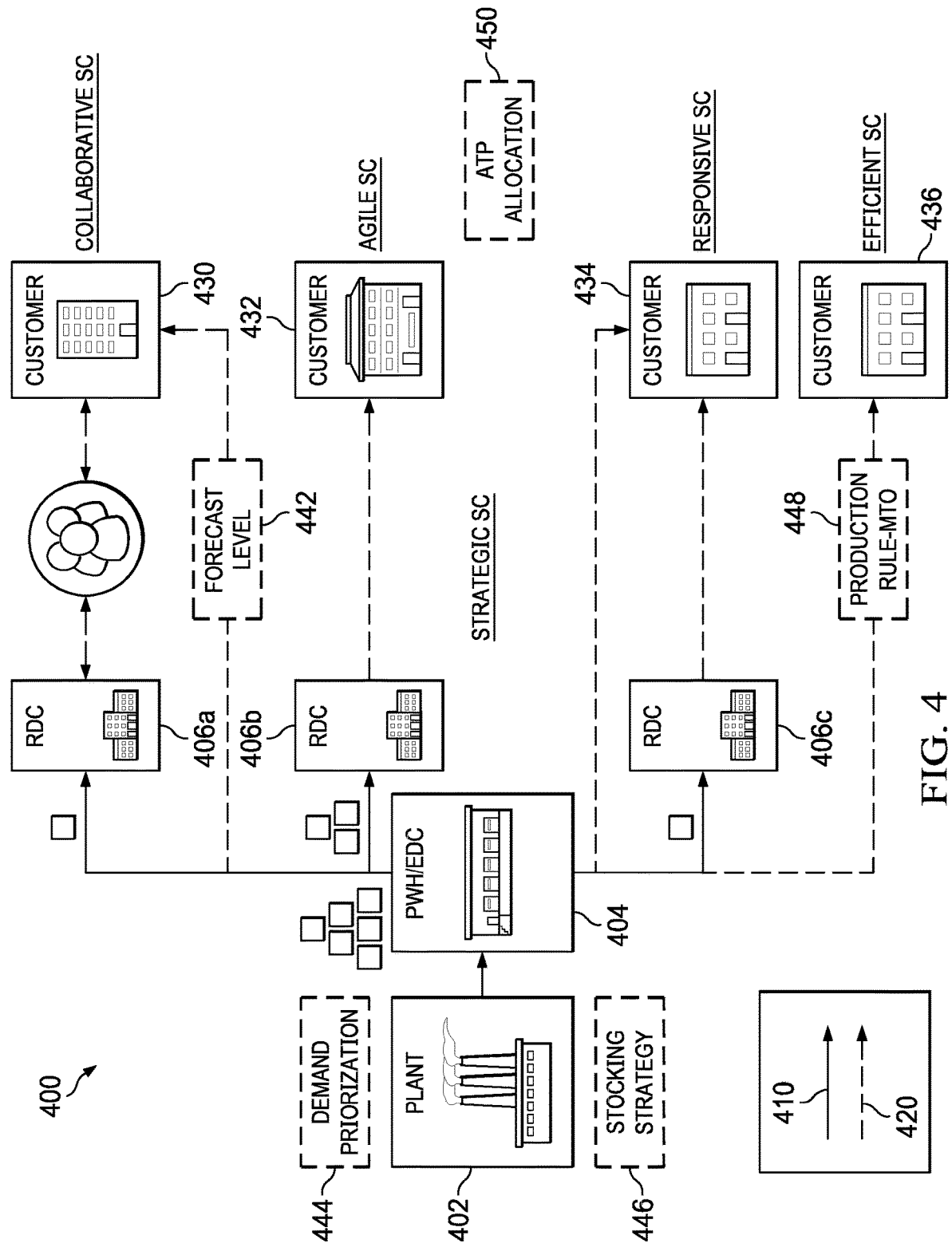
FIG. 4 illustrates a simplified segmented supply chain network with various exemplary supply chain models and various exemplary steering options, according to an embodiment.

FIG. 4 illustrates a simplified segmented supply chain network 400 with various exemplary supply chain models and various exemplary steering options, according to an embodiment. Steering options may comprise differences in supply chain processes or services that result in different outcomes to one or more customers. For example, for exemplary customers such as retailer 158 and a wholesaler, retailer 158 and wholesaler may require different services or outcomes from the supply chain. To create that outcome, the supply chain may be configured with different steering options to alter the behavior the supply chain, such as, for example, using different levers to alter one or more supply chain planning and execution processes.

As illustrated in the simplified segmented supply chain network 400, a manufacturing plant 402 of manufacturer 154 may be associated with a plant warehouse (PWH), which indicates a dedicated warehouse associated with manufacturing plant 402, and/or European Distribution Center (EDC) 404. Manufacturer 154 may store large amounts of inventory in the PWH/EDC 404. This inventory may be used by customers associated with the strategic supply chain model. Several Regional Distribution Centers (RDC) 406a-406c may receive replenishment of inventory from the PWH/EDC 404. The inventory may be replenished in different amounts, as represented by the differing number of boxes next to each RDC 406a-406c. Replenishment is indicated by solid line 410. Four exemplary customers 430-436 receive inventory from the RDC 406a-406c or directly from PWH/EDC 404 as indicated by dashed line 420. Each of these customers 430-436 is associated with a different supply chain model, which determines how the customer will be supplied with inventory from different locations in segmented supply chain network 400. To further explain how supply chain models determine customer service levels, several examples are now given.

Each supply chain model comprises key characteristics that determine a particular service offering for customers associated with that supply chain model. Five exemplary supply chain models are illustrated: efficient, responsive, agile, collaborative, and strategic. Each delivers a different service package for specific types of customers and products. An efficient supply chain model may be associated with cost effective service packages (such as, for example, Make-To-Order (MTO)). A responsive supply chain model may be associated with a standard service package (such as, for example, a default service level). An agile supply chain model may be associated with a premium service package. A collaborative supply chain model may be associated with a customer collaboration service package. A strategic supply chain model may be associated with a regional importance service package. Each of the supply chain models may be configured with different steering options to enforce the outcome desired for each customer and product. Each steering option represents a lever 504 (FIG. 5) which, when configured, alters one or more supply chain planning and execution processes according to the configuration options 508 associated with each particular lever 504.

For example, as illustrated in the above figure, a steering option may comprise, for example, forecast level lever 442, demand prioritization lever 444, stocking strategy lever 446, production rules lever 448, and ATP allocation lever 450.

Forecast level lever 442 may comprise forecasting demand and supply at different hierarchical levels, as described in more detail below. Demand prioritization lever 444 may comprise prioritizing the demand differently for different customer groups 444. Stocking strategy lever 446 may comprise defining a different stocking strategy whereby for some groups the inventory is kept closer to the customer or closer to the plan in the available distribution network.

Production rules lever 448 may comprise one or more production rules such as, for example, made-to-order (MTO), engineered-to-order, made-to-stock, and the like. According to embodiments, ATP allocation lever 450 comprises forecasting a customer level and then allocating inventory at the same level.

According to some embodiments, levers 504 comprise one or more module configuration rules 508, which create different behaviors and different outcomes for specific customer groups, as described in more detail below.

By way of a first example, a collaborative supply chain model has a characteristic of regular data exchange with customers 430. This may mean that customers 430 share a demand forecast, replenishment data, and inventory levels each day with the supplying company. Sharing the demand forecast, replenishment data, and inventory levels with the company allows the company to collaborate with customer 430 to ensure that the company's production and shipping plans will meet the demand forecast and inventory levels for customers 430 associated with the collaborative supply chain model at a lower cost and with less safety stock. Based at least in part on the increased visibility, the company may anticipate replenishments, deliveries, or even production to meet sudden changes in the demand forecasts and inventory levels of customers 430.

By way of a second example, an efficient supply chain model made be associated with a made-to-order business. For these customers 436, manufacturer 154 may ship large quantities directly from a manufacturing plant 402 to the made-to-order business without storing any inventory in the segmented supply chain network 400, leading to significant cost savings in production and storage.

By way of a third example, customers 432-434 associated with an agile supply chain model and responsive supply chain model may receive inventory from one or more RDCs 406b-406c. For customer 432 associated with the agile supply chain model, orders are placed in an ad-hoc pattern which requires RDC 406b to keep a large inventory closer to customers 432 and only use PWH/EDC 404 if order lead-times allow such a delay. In contrast, for the responsive supply chain model, customers 434 order at regular intervals in large quantities which allows RDC 406*c* to keep a lower inventory and instead provides for regular and frequent full truckload plant shipments directly from PWH/EDC 404.

Figure 5:
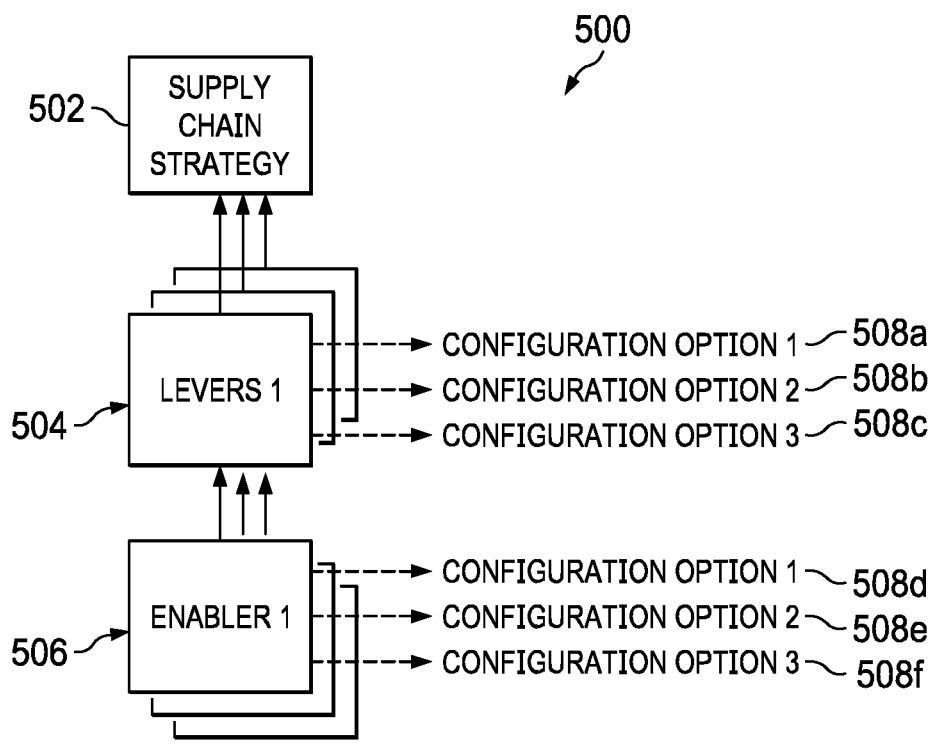
FIG. 5 illustrates a differentiator hierarchy for module configuration, according to an embodiment.

FIG. 5 illustrates differentiator hierarchy 500 for module configuration, according to an embodiment. Module configuration may require one or more differentiators. A high-level differentiator may comprise various supply chain strategies 502. A mid-level differentiator may comprise levers 504. A low-level differentiator may comprise enablers 506. At a general level, each supply chain strategy 502 relates to a supply chain model (such as agile, responsive, collaborative, and the like.) To cause the supply chain to reflect the chosen supply chain strategy 502, one or more levers 504 and one or more enablers 506 are activated to support the chosen supply chain strategy 502. Each supply chain strategy 502 may be associated with various levers 504 to modify functions of the modules to behave differently. For levers 504 to operate in the modules, one or more enablers 506 may need to be activated.

Levers 504 comprise primary differentiators between supply chain strategies. Enablers 506 comprise additional functions that may be needed to activate supply chain strategy 502. Each lever 504 and enabler 506 may be associated with one or more configuration options 508*a*-508*f*. Configuration options 508*a*-508*f* comprise a particular implementation of one or more implementations of levers 504 and enablers 506 that differentiate that lever 504 or enabler 506 from others. To further illustrate supply chain strategies 502, levers 504, and enablers 506, an example is now given.

Figure 6:
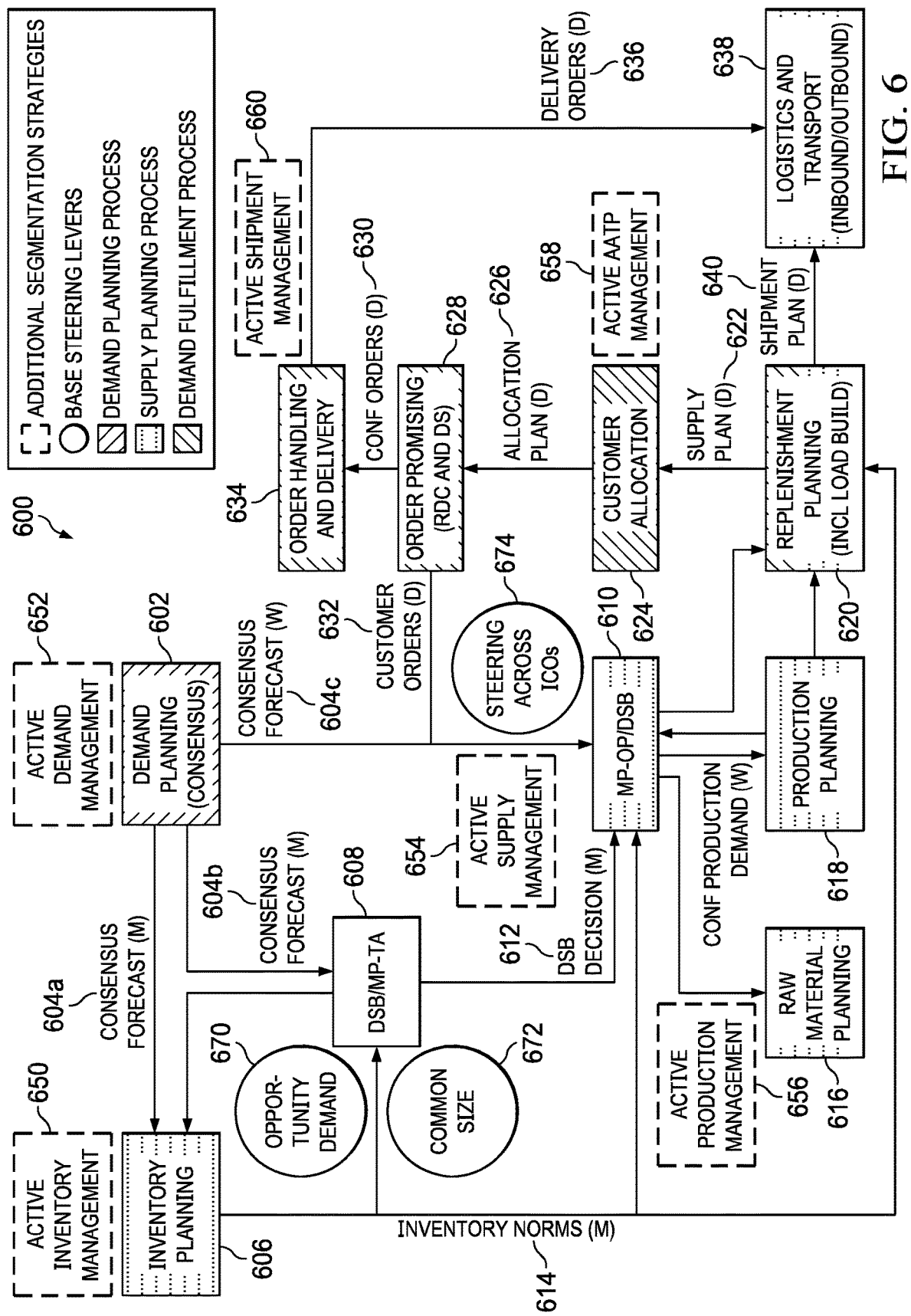
FIG. 6 illustrates an exemplary overview of supply chain planning and execution processes with various exemplary supply chain strategies and levers, according to an embodiment.

FIG. 6 illustrates an exemplary overview 600 of supply chain planning and execution processes with various exemplary supply chain strategies 502 and levers 504, according to an embodiment. According to embodiments, a supply chain comprises various modules for planning and execution processes which interact to perform various supply chain operations, including demand planning, inventory planning, production planning, and the like. According to embodiments, segmentation strategies module 204 modifies the various supply chain planning and execution processes using supply chain strategies 502 to enforce one or more selected supply chain models and altering the supply chain operations. As noted by various processes, M, W, and D indicate whether a process is performed in the exemplary supply chain on a monthly (M), weekly (W), or daily (D) basis. Monthly processes may comprise longer-term planning processes. Weekly processes may comprise update processes (which may occur each weekend, for example). Daily processes may comprise transactional processes, such as, for example, making orders on a day-to-day basis or shipping inventory on a day-to-day basis.

According to embodiments, demand planning process 602 may comprise a process comprising forecasting demand by one or more companies or customers. These forecasts 604*a*-604*c* may then be transmitted for use to one or more other processes for determining the appropriate inventory levels, such as, for example, to inventory planning process 606, tactical master planning process (MP-TA) 608, and/or operational master planning process (MP-OP) 610. in order to balance demand and supply for both tactical and operational supply planning horizons. According to embodiments, tactical master planning process 608 and operational master planning process 610 balance demand and supply over these two distinct horizons, supported by the evaluation of various potential demand and supply scenarios using demand and supply balancing (DSB), which analyzes and evaluates various potential business scenarios. As part of sales and operations planning (S&OP), demand and sales balancing may occur at monthly frequency to evaluate gaps between forecasted demand and supply plans, which may be constrained due to, for example, missing production capacity or raw material availability. Although demand and sales balancing is described as occurring monthly, demand and sales balancing may occur at other frequencies, such as daily, weekly, or the like. According to embodiments, tactical master planning process 608 using demand and supply balancing may generate a DSB decision 612 comprising, for example, market and product priorities such as an amount of production to short, solutions to minimize lateness, and/or how to allocate scarce production capacity to meet market demands. For instance, continuing with the example discussed above of an exemplary tire manufacturer, if demand planning process 602 projects a demand forecast 604*a*-604*c* of 10 million tires of different types, the tire company may then determine production capacity and balance the available supply, which may be more or less than 10 million tires, with the projected demand. According to embodiments, inventory planning process 606 generates inventory norms 614.

After balancing demand and supply, operational master planning process 610 may create a feasible supply chain master plan, which may then be translated by different supply chain processes or activities, including, for example, raw material planning process 616, production planning process 618, and replenishment planning process 620. Raw material planning process 616 may use the master plan to procure raw materials for production (such as raw materials to produce tires for the exemplary tire manufacturer). Production planning process 618 may use the master plan to create the details of a production plan along one or more production lines. Replenishment planning process 620 may use master plan to drive distribution activities, such as, for example, the transportation of items between different nodes in supply chain network 100.

Supply plan 622 is based, at least in part, on master planning (MP-TA, MP-OP) decisions (both tactical and operational) about, for example, production priorities, shorting production for certain products and customers, and the like, as a result of the demand=supply balancing, described above. According to embodiments, supply plan 622 reflects business priorities that meet the demand with the available production capacity. Generating supply plan 622 provides for aligning production plans with business, customer and product service priorities, leveraging available capacity to meet business targets, and producing according to agreed business and market priorities.

Customer allocation process 624 comprises allocating available or future planned inventory for future incoming orders. Based on one or more allocation rules, the inventory for each product, resulting from supply plan 622, and either stored in a warehouse or on its way to the warehouse (such as, for example, in planning, in production, in transit, and the like) is allocated to various customer groups, based, at least in part, on one or more predefined rules (such as, for example, as per forecast, as per split %, and the like) According to embodiments, customer allocation process 624 makes available inventory virtually available to different levels of customers with different service priorities (reservations) or kept free for all customers to consume. Customer allocation process 624 comprises a reservation system for current and future available inventory. Depending on the customer, orders will be able to consume either all available inventory or only a small and allocated part of the inventory. By leveraging this concept, manufacturers 154 and retailers 158 may prevent first-come-first-serve inventory consumption, where all inventory is freely available for everybody. For example, customer allocation process 624 may allocate certain parts of an inventory to higher priority customers, and protect it from orders from other customers.

Allocation plan 626 may comprise at least two types of supply for customers. Available-to-Promise (ATP) comprises an original supply plan 622 consisting of current and future available inventory. ATP may comprise, for example, an available supply of items for fulfilling orders, such as, for example, items stored in one or more warehouses, distribution centers 156, or the like. Some portion of ATP inventory may be transformed into allocated-available to promise (AATP) and is not available for ordinary customers. One or more allocation rules specify which customers may consume inventory allocated to each type of customer. The one or more allocation rules may reserve inventory and may be company specific. Allocation plan 626 comprises the calculated reserved and free inventory showing ATP (e.g. available supply) and how it was converted into AATP (e.g. reservations).

Order promising process 628 comprises checking in real time, as orders received by an order entry system and/or segmentation analyzer 110, against inventory projections, ATP, and AATP, to reserve inventory to meet each order and calculate a promise date for each order. As described in more detail below, some customers' orders will be allowed to consume only free inventory. Other customers' order will consume from AATP, which comprises guaranteed inventory and may not be consumed earlier orders of other customers.

According to embodiments, order promising process 628 is performed by an AP-OP engine and comprises a first action, for calculating AATP based, at least in part, on available inventory from supply plan 622, a second action, for checking incoming orders against AATP, and a third action, for calculating a reliable due date or order promise, based, at least in part, on reserved inventory. Reserved inventory comprises, for example, one or more available items, such as, for example, one or more available warehouse items or future available items based on supply plan 622. According to embodiments, the due date is calculated based, at least in part, on for example, a leadtime to a customer from a local warehouse or RDC, whether a direct shipment is allowed for that customer, and the like. Additionally, or in the alternative, the order entry system receives confirmed orders with a reliable due date promised by the AP-OP engine and, generally, happens in real time, wherein, for each order, AP-OP engine scans AATP to provide a reliable, fast, and accurate order promise confirmation with the correct due date.

Confirmed orders 630 comprises orders received from the order entry system by the AP-OP engine and for which a reliable due date has been promised. Customer orders 632 comprise orders from an order entry system and are electronically communicated to demand planning process 602 and/or order promising process 628. Customer orders 632 may be used to create a demand plan comprising netted forecasts and orders. Additionally, or in the alterative, customer order 632 are received by order promising process 628 and given a reliable promised due date and confirmation.

Order handling and delivery process 634 comprises releasing an order for execution after, for example, a credit check, and setting up a transport order to ship the customers' orders, after a reliable due date is received. Delivery orders 636 comprise executed delivery orders, passed to transportation network 140, to ship products to the right customers, with any necessary logistics and commercial documentation.

Logistics and transport process 638 comprises execution of delivery orders 636. Shipment plan 640 comprises a sum of all shipments to execute all delivery orders created in an order entry system and ready to be shipped by transportation network 140.

To avoid double counting of demand, the orders received by the order entry system, may be subtracted from the forecasted demand twice in this end-to-end process. A first netting may be performed prior to the creation of supply plan 622. According to embodiments, a forecast is converted into a net forecast by subtracting existing orders. A second netting may be performed prior to replenishment planning 620 as the total forecast must be reduced by the orders that already are entered in the order entry system. Both for supply planning and replenishment planning 620, the total demand to plan is the net forecast plus the existing orders (subtracted from the total forecast).

To further describe the demand fulfillment process, an example is now given of replenishment plan being translated into logistic activities. For example, after the number of inventories moved between different nodes is determined, transportation is determined by one or more transport companies in transportation network 140. After determining how much inventory is being transported, demand fulfillment processes may be determined to allocate inventory to different customer groups. For the exemplary tire manufacturer, this may mean keeping 50% of inventory in particular warehouses for car manufacturers, keeping 30% for wholesalers, and 20% for retailers.

Once the allocation is done, then promises may be made against the allocation. For example, if a first warehouse, Warehouse A, stores 50,000 tires available for a customer group, Customer Group B, when Customer Group B enters an order for tires through the company's order system, the company may adjust the inventory and promise these orders against the available inventory in real time. The company will know how much inventory is in the warehouse, the size of the orders, and so may check each order against the available inventory and promise in real time, including the kind of available inventory and the time it will be available, for each customer that placed an order. According to embodiments, this may comprise Available Allocated to Promise (AATP), which is a function for companies to give a reliable due date for each order for each customer.

As discussed above, segmentation strategies module 204 configures supply chain modules and processes (including any supply chain management software which operates the modules of planning and execution processes, which may be operated on or in communication with one or more servers or databases of segmentation analyzer 110, inventory system 120, one or more imagers 130, transportation network 140, one or more supply chain entities 150, and/or computer 160 of supply chain network 100) to enforce priorities determined by the supply chain models, and, in some cases, may override supply chain actions to enforce the supply chain models. In the exemplary overview 600, segmentation strategies module 204 has configured the supply chain modules and processes using an active inventory management supply chain strategy 650 (associated with inventory planning process 606), active demand management supply chain strategy 652 (associated with demand planning process 602), active supply management supply chain strategy 654 (associated with operational master planning process 610), active production management supply chain strategy 656 (associated with raw material planning process 616), active AATP management supply chain strategy 658 (associated with customer allocation process 624), and active shipment management supply chain strategy 660 (associated with order handling and delivery process 634). Although particular segmentation strategies are associated with particular supply chain processes, embodiments contemplate any number of segmentation strategies associated with various supply chain processes, according to particular needs.

For example, segmentation strategies module 204 may configure order and handling delivery process 634 with active shipment management supply chain strategy 660 to override a supply chain action that would ship a product to a low priority customer before a high priority customer. As discussed below, a customer associated with a collaborative supply chain model may have higher priority than a customer associated with a responsive supply chain model. According to embodiments, segmentation strategies module 204 configures the supply chain management software to prioritize, for example, product orders for the customers associated with the collaborative supply chain model (who may be paying a higher cost to the company for the prioritized service). According to another example, segmentation strategies module 204 may configure the supply chain management software to hold inventory for the customers associated with a higher priority supply chain model, even when an order has been placed by a customer associated with a lower priority supply chain model, by using an active AATP management supply chain strategy 658.

Additionally, in the exemplary overview 600, segmentation strategies module 204 has configured the supply chain modules and processes using various levers 504, including, opportunity demand lever 670 (associated with tactical master planning process 608), common size lever 672 (associated with tactical master planning process 608), and steering across ICOs lever 674 (associated with operational master planning process 610). Although particular levers 504 are associated with particular supply chain processes, embodiments contemplate any number of levers 504 associated with various supply chain processes, according to particular needs.

As discussed above, supply chain strategies 502, levers 504, and enablers 506 are based, at least in part, on a customer hierarchy generated by clustering module 202.

Figure 7:
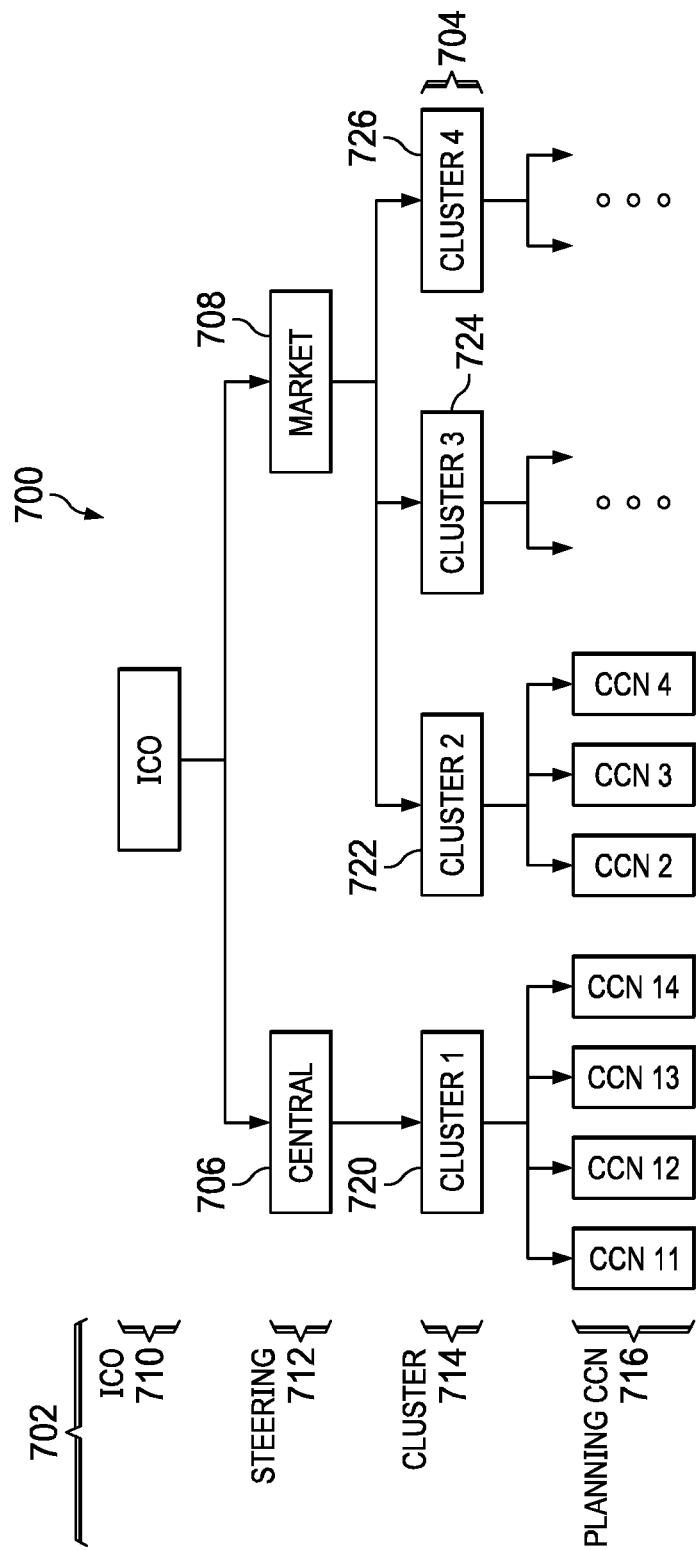
FIG. 7 illustrates an exemplary a customer hierarchy, according to an embodiment.

FIG. 7 illustrates an exemplary customer hierarchy 700, according to an embodiment. At action 304, segmentation strategies module analyzes customer hierarchy to determine forecast and allocation level for customers, products, and customer-product combinations.

For example, segmentation strategies module 204 determines at which level 702 of the hierarchy forecasts and allocations of products are made for each customer in customer hierarchy 700. Forecasts and allocations of products may be made at different levels of the hierarchy depending on the supply chain model associated with the customers in customer hierarchy 700. Forecasts and allocations may be determined for an individual customer, a group of customers, or a region (such as a country), or any other grouping or level of hierarchy.

Customer hierarchy 700 defines the level 702 at which planners manage forecasts and allocations of the supply chain. According to an embodiment, forecasting and allocation may be done at different levels 702 in hierarchy 700, depending on cluster 704. Levels 702 comprise a country level (which may also be referred to as an intercompany entity (ICO) level 710 (e.g. a market level)), a steering level 712, a cluster level 714, and a planning customer code number (planning CCN) level 716. According to embodiments, clustering module 202 adjusts customer hierarchy 700 by defining an intermediate level of granularity that balances between forecasting and allocating all products for each customer and forecasting and allocating all products at a country or regional level for these customers.

As illustrated, ICO level 710 contains only the ICO. Steering level 712 comprises central steering 706 (the regional organization controlling regional inventory allocation decisions) and market steering 708 (the country organizations controlling more local inventory allocation decisions in each country). Cluster level 714 comprises the supply chain models associated with each customer cluster (i.e. Strategic, Collaborative, Agile, and Responsive, and the like). Clusters 704 may each be associated with a supply chain model such as, for example, Cluster 1 720 may be assigned to a strategic supply chain model, Cluster 2 722 may be assigned to a collaborative supply chain model, Cluster 3 724 may be assigned to an agile supply chain model, and Cluster 4 726 may be assigned to a responsive supply chain model.

Planning CCN level 716 comprises the various CCNs (i.e. CCN11, and various CCN2s). Additionally, the CCN2 of an agile supply chain model may comprises two "sold to" boxes: sold to 1 and sold to 2. In this instance, allocation of inventory may be set to even a finer granularity than customer granularity, such as, for example, allowing the local market organizations to allocate inventory, because, for some customers it is critical to guarantee availability and service to a particular ship-to location, to avoid the other ship-to location for that same customer orders all the tires and consumed the available inventory.

For example, allocation comprises a process of taking a committed supply plan 622 and defining how available future inventory for different products will be made available to different customer segments. By way of example and not by limitation, if a million tires will become available in regional distribution center 406a-406c in a particular region, an allocation process may comprise determining which part will be reserved (for particular customers or pools of particular customers) or be available as free inventory to all customers. An allocation process may carry out these allocations based on rules, such as per committed forecast, fixed split, or fixed quantity to make sure inventory cannot be consumed on a first-come-first-serve basis by lower priority customers, before higher priority customers placed their orders. As such, allocation may protect the inventory and the future service for the higher priority customers.

Governance indicates whether planning CCNs are steered centrally 706 or by markets 708, as indicated at steering level 712, and as indicated in more detail below. Continuing with the exemplary tire manufacturer, a planning CCN provides each single market to allocate market open tires in a controlled away. Instead of forecasting each customer, markets may forecast groups of 'same service' customers into a predefined grouping of customers, planning CCNs, and allocate or reserve a specific tire quantity for them.

For example, continuing with the example of a tire manufacturer, segmentation strategies module 204 may determine that a forecast will be made at a customer level for a big-box retailer with stores nation-wide that sells tires from the tire manufacturer. The forecast may be made at customer level for the big-box retailer based on the big-box retailer being associated with a collaborative supply chain model. The collaborative supply chain model may have been associated with the big-box retailer because the big-box retailer is a strategic customer of the company that the big-box retailer has a service level agreement with the company, or other considerations that determine the supply chain model associated with the big-box retailer, as explained below. On the other hand, a small retailer, such as a mom-and-pop store may be forecasted with all other mom-and-pop stores at the country level because they are associated with a responsive supply chain model. The responsive supply chain model may have been associated with the mom-and-pop stores because they are too small or too numerous to generate individual forecasts, they are not a strategic customer of the company, they do not have a service level agreement, or other like considerations.

Similar to the determination of the forecasting level, segmentation strategies module 204 determines appropriate levels of detail for allocations of inventory based on similar considerations.

Figure 8:
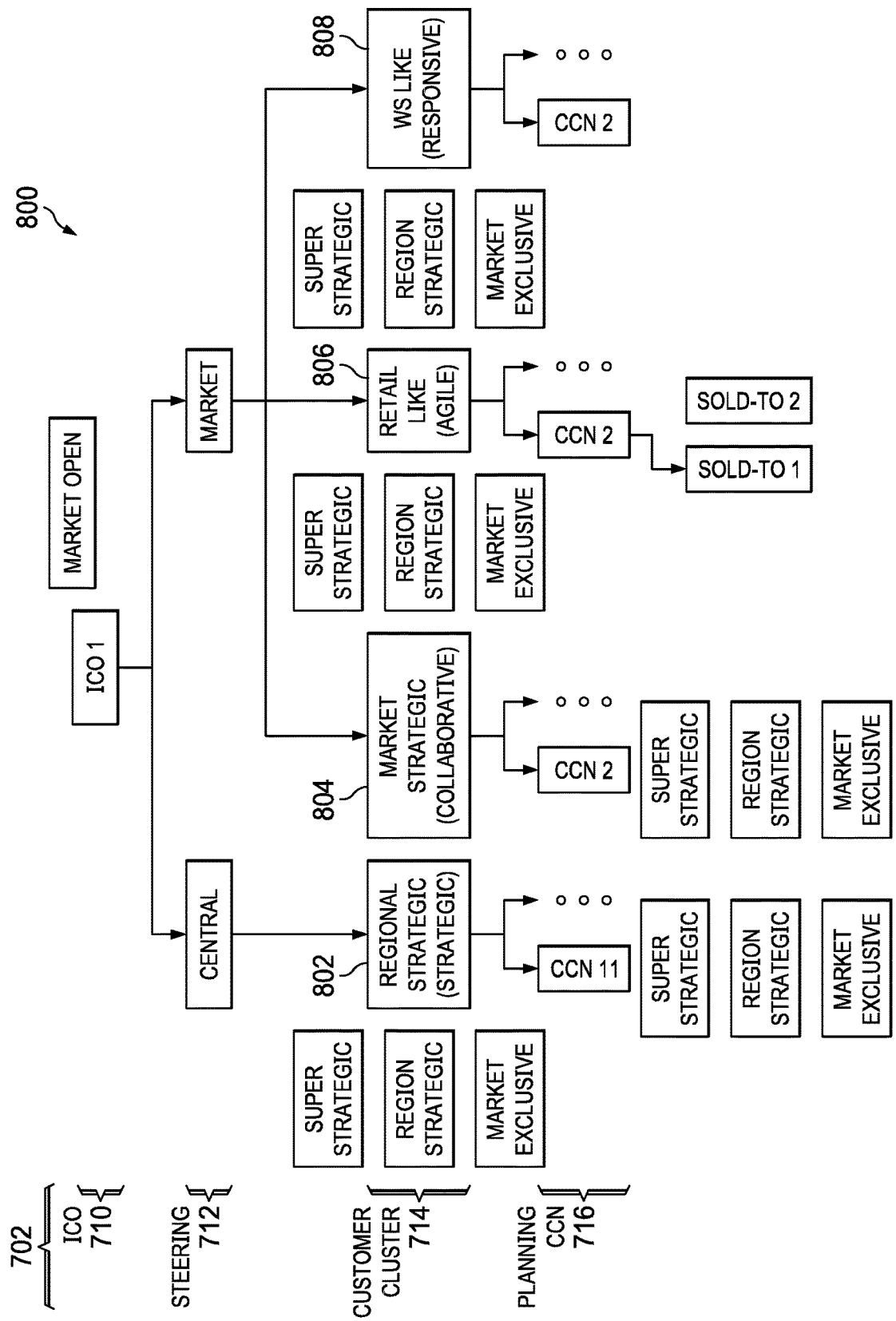
FIG. 8 illustrates an exemplary allocation logic for various supply chain models associated with customer hierarchy, according to an embodiment.

FIG. 8 illustrates exemplary allocation logic 800 for various supply chain models associated with customer hierarchy 700, according to an embodiment. According to the exemplary allocation logic 800, customer clusters 802-808 are associated with four exemplary supply chain models, "Strategic," "Collaborative," "Agile," and "Responsive." A responsive supply chain model may be forecast at customer cluster level 714, an agile supply chain model may be forecast separately from the agile customers and at planning CCN level 716. In other words, wholesale-like customer cluster 808 is associated with a responsive supply chain model and these customers may be forecast in connection with Cluster 4, while retail-like customer cluster 806 are associated with an agile supply chain model and are forecast in connection with Cluster 3. Collaborative customers cluster 804 are forecast with Cluster 2 and Strategic customer cluster 802 are forecast with Cluster 1. According to some embodiments, allocation and forecasting are done for the same clusters and levels. Therefore, a strategic customer in strategic customer cluster 802 would receive priority and first allocation of tires, so they are associated with Cluster 1.

Additionally, based on the particular cluster assignment, customers may receive products that have been promised to inventory for customers in a lower cluster assignment. For example, if a customer associated with a strategic supply chain model orders more product than forecasted, the company may deliver product that was promised to inventory for customers in a lower cluster. On the other hand, a customer associated with a collaborative supply chain model would be able to take inventory promised to customers associated with Cluster 3 and Cluster 4, but not from Cluster 1. According to embodiments, the cluster assignment may automatically enforce a prioritization that has been assigned to the customers.

By way of a more particular example, a big box retailer may be assigned a strategic supply chain model based on a service level agreement, whereas a mom-and-pop store might be assigned to a responsive supply chain model. The big box retailer may have reserved inventory, stored at one or more strategic inventory locations, whereas the mom-and-pop store receives only free inventory. The big box retailer will receive first priority to inventory, whereas the mom-and-pop store will only receive inventory after all other customers' needs have been met. Customers assigned to one or more intermediate priorities between strategic customers and responsive customers may receive pooled inventory.

To further explain allocation logic 800, another example is now given. As discussed above, an allocation of products might not be identical for all products. For example, super strategic products may represent, for example, specialized tires for luxury cars, produced in small batches with absolute top priority. These super-strategic tires would be managed and allocated to various customers centrally. Regional strategic tires, may comprise, for example, special 'private label' tires, with the brand of the distributor distributed across the region. Market specific tires may comprise, for example, a local brand very popular in a particular country with an exclusive partnership agreement between the tire manufacturer and the local national distributor. Market open may comprise products that are provided in a fair-share manner to any customer in a market. Each market would have the autonomy about how to allocate the available inventory to its own customer base.

The above overview of an exemplary supply chain process services many different customer groups. In the above methods, the company has defined different support options for each of the customers. Therefore, along these processes, the company needs to differentiate the services to provide the outcomes chosen by the supply chain models.

2. Design Strategies, Levers, and Configuration Options

At action 306 of segmentation strategies method 300, segmentation strategies module 204 may design strategies 502, levers 504, enablers 506, and configuration options 508.

To provide differential service, segmentation strategies module 204 may define one or more supply chain strategies 502 to enable the supply chain model. As illustrated in FIG. 6, segmentation strategies module 204 selected supply chain strategies 502 comprising active inventory management supply chain strategy 650, active demand management supply chain strategy 652, active supply management supply chain strategy 654, active production management supply chain strategy 656, active AATP management supply chain strategy 658, and active shipment management supply chain strategy 660. Although these particular supply chain strategies 502 are chosen for this supply chain, embodiments contemplate any suitable number or combination of supply chain strategies 502, according to particular needs.

FIG. 9 illustrates supply chain strategies 502 selected to differentiate supply chain models, according to an embodiment. According to embodiments, each supply chain strategy 502 comprises a default strategy 902 and special case strategies 904. For example, an active demand management supply chain strategy 652 may comprise setting the detail level at which forecasts are made. By default, a company may forecast by market, such as by region, state, country, or the like. For a responsive supply chain, that level of granularity is adequate. However, for a customer that has a service level agreement, such as a big box retailer, the customer may need a higher level of service. This may require a more granular forecast and to forecast that customer separately from other customers in the same market. In other words, a responsive supply chain may forecast for the market level, but for higher service levels (such as an agile or collaborative supply chain model), the level of granularity is higher or finer.

By way of a further example, active AATP management supply chain strategy 658 may be improved by a more granular forecast. Active AATP management supply chain strategy 654 provides an advantage of the company working directly with the customer to make the quality of the forecast better. Because the forecast is more accurate, the company may improve allocation as well. The company may, for example, keep the inventory for a particular customer separate from other customers, so that the company may keep AATP or a virtual protected inventory in a warehouse specifically for the customer.

Active supply management supply chain strategy 654 comprises prioritizing supply. If a capacity for production is not sufficient, some items will be produced late or not produced at all. According to embodiments, active supply management supply chain strategy 654 configures one or more supply chain planning and execution processes to prioritize and choose what items will be delayed, such as being produced or supplied late, or choosing what customers will be supplied late or have their items produced late. In other words, active supply management supply chain strategy 654 may choose which customers' orders are prioritized over the orders of other customers by allocating capacity to some customers before others. For the exemplary tire manufacturer, this may comprise prioritizing car manufacturers over, for example, mom-and-pop stores or stores that offer replacement tires.

Active inventory management supply chain strategy 650 may comprise allocating where inventory is stored, such as, for example, in a plant warehouse, regional distribution center, customer warehouse, or the like. Depending on the supply chain model, one or more supply chain planning and execution processes will position inventory at different places in supply chain network 100, with a goal to keep the inventory as far away from the customer as possible (in order to give more flexibility of deploying the inventory), while still meeting all the needs of the customers. For example, if an entire order is stored in Tennessee, and an order is received from New York, the company will face additional costs and delays to move the tires between the two regions. Therefore, it is more cost effective to keep the tires at the manufacturing plant and move them once as the order is received. However, for some customers, tires are expected at the store within four hours. Keeping the tires at the plant warehouse would prevent the company from meeting this timeline. Therefore, the inventory for customers with short order times must be kept at storage facilities closer to the individual stores for that customer.

Active shipment management supply chain strategy 660 may comprise determining the proper allocation of inventory to one or transportation vehicles 146. There is always a tradeoff between completely filling a transportation vehicle 146, such as a truck, and having enough order to fill the transportation vehicle 146 before it leaves a storage facility. For some supply chain models, transportation network 140 may determine that transportation vehicle 146 must be completely full; for other supply chain models, transportation vehicle 146 may be partially full, or to even provide for parcel service.

Active production management supply chain strategy 656 determines advance production techniques for products based on an associated supply chain model. According to embodiments, some products may be made as they are needed and other products may need to be made in large supplies in advance. For example, a company, such as the exemplary tire manufacturer, may supply tires to a customer, such as a large car manufacturer. Based on the contracts between the company and the customer, if the company fails to deliver tires, the company may face penalties that could exceed millions of dollars per day. In that example, active production management supply chain strategy 656 may ensure that the production is always sufficient to supply the forecasted needs for the customer. On the other hands, some customers may need a private label order, which may be a large value tire at a low price. In this case, active production management supply chain strategy 656 may wait for the order to begin production without building any stock in advance. In some cases, made-to-stock is a default production strategy, made-to-order is used for commodity and private label orders.

FIG. 10 illustrates supply chain levers 504 associated with various supply chain strategies 504 and configuration options 508, according to an embodiment. As discussed above, levers 504 comprise configurable features in various modules for supply chain planning and execution processes. For example, a forecast lever 442 provides for forecasting at different levels of the supply chain, such as, for example, ICO level 710 (e.g. a market level), a country level, state level, customer level (e.g. Planning CCN level 716), cluster level 714 (or a group of customers), or any other like level, according to particular needs.

According to a further example, active inventory management supply chain strategy 650 may be effected by stocking strategy lever 446. The stocking strategy may be chosen between, for example, upstream-high, downstream-low, upstream-low, downstream-high, or none. This indicates, for example, that for MTO customers, the company will not store inventory. In supply chain models that postpone, inventory is kept at a high level, for example, upstream-high. And, for supply chain models where the inventory is kept close to the customers, downstream-high may be chosen.

For active supply management supply chain strategy 654, an associated lever 504 may comprise demand prioritization lever 444. A default for demand prioritization lever 444 may be fair share, which treats all demands equally. However, demand prioritization lever 444 may be configured to prioritize certain customers, products, or clusters of customers and products.

As indicated above, customers, products, and customer-product clusters each may comprise an associated priority. In situations where production capacity is not enough to meet a forecasted volume, the last customer, products, or customer-product clusters that will be shorted will be the ones with the highest priorities. In other words, supply chain production planning process 618 will short the demand for the customers and products that are associated with lower priority clusters. The production planning process 618 may determine priority based on a ranking of customers, products, or clusters, according to particular embodiments.

Active production management supply chain strategy 656 may comprise production rule lever 448. According to embodiments, production rule lever 448 comprises a made-to-stock default production rule and an exception made-to-order production rule for, for example, private label customers, as explained in detail above.

Active AATP management supply chain strategy 658 may comprise ATP allocation lever 450. Configuration options 508 for ATP allocation lever 450 may be similar to configuration options 508 for forecast level lever 442. ATP allocation lever 450 may, for example, forecast a customer level and ATP allocation lever 450 may then allocate inventory at the same level. If forecasting is done at a market level, for example, then allocation may be done at the market level as well. In other words, if the forecasting is performed for a big box retailer at the customer level, then the allocation of inventory for the big box retailer may also be performed at the customer level. If the forecast is done for an entire market, such as, for example, the entire German market, then the allocation of inventory will be stored for the entire market.

Active shipment management supply chain strategy 660 may be associated with delivery strategy lever 1004. Delivery strategy lever 1004 may comprise, for example, a "direct ship full truck load" (DS-F TL), "direct ship lessen truck load" (DS-LTL), RDC, and expedite configuration options 508. These configuration options 408 for various shipping strategies may be chosen to effect the supply chain model chosen for the particular customer, product, or customer-product cluster.

As mentioned above, particular configuration options 508 are chosen for each of levers 504 to alter various supply chain planning and execution processes to enforce the particular supply chain model chosen.

3. Differentiate Configuration Options by Supply Chain Model

At action 308 of segmentation strategies method 300, segmentation strategies module 204 may differentiate configuration options 508 by an associated supply chain model for each lever 504 and supply chain strategy 502.

Figure 11B:
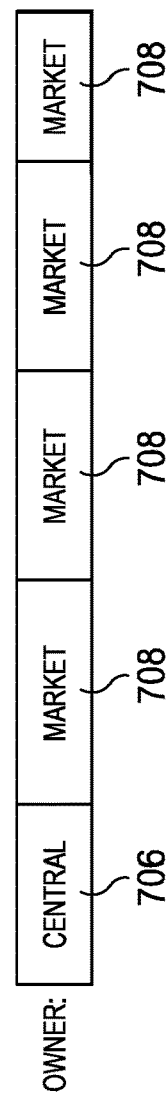
FIG. 11 illustrates particular configuration options for various exemplary supply chain models, according to an embodiment.

FIG. 11 illustrates particular configuration options 508 for various exemplary supply chain models 1102-1110, according to an embodiment. For the five exemplary supply chain models 1102-1110 mentioned in the above example—strategic supply chain model 1102, collaborative supply chain model 1104, agile supply chain model 1106, responsive supply chain model 1108, and efficient supply chain model 1110—each of supply chain strategies 502 requires particular configuration options 508 for each of levers 504. Some of the configuration options 508 are the same for supply chain models 1102-1110, and some are changed. For a default supply chain model, here, the responsive supply chain model 1108, configuration options 508 represent default configuration options 508. Although responsive supply chain model 1107 is a default in the above example, any supply chain model 1102-1110 may be a default, according to particular needs. In order to move customers or products to different supply chains, configuration options 508 are modified from the defaults. Exemplary changes may be made to configuration options 508 to move customers and products to different supply chains, such as agile supply chain model 1106, efficient supply chain model 1110, or the like, and additionally, which owner (such as central 706 (e.g. a planning department) or market 708) configures that supply chain model.

According to some embodiments, most or all customer, products, or customer-product clusters are initially placed in a default supply chain model. To improve service to customers, various levers 504 may be configured to move customer, products, or customer-product clusters from default supply chain model to a different supply chain model, although his may increase the cost. Additionally, to improve cost, some customer, products, or customer-product clusters, various levers 504 may be configured that reduce service, but also reduce cost to customers.

FIG. 12 illustrates configuration options 508 for levers 504 for a strategic supply chain model 1102, according to an embodiment. As discussed above, each supply chain model 1102-1110 may receive configuration options 508 that configure levers 504 that alter supply chain planning and execution process modules to change services or cost for particular customers, products, or customer-product clusters. Additionally, also as discussed above, configuration options 508 may determine at which hierarchy level 702 forecasting and allocation may be chosen, which affects service and cost by working with various levers 504 to determine, for example, where inventory is stored, how products are produced, and other like supply chain processes. Additionally, levers 504 may be inserted between particular supply chain planning and execution processes or between particular supply chain entities 150. To configure the supply chain network 100 to enforce strategic supply chain model 1102, configuration options 508 for forecast lever 442 are set to cluster level 714 or planning CCN level 716, allocation lever 450 is set to cluster level 714, demand prioritization lever 444 is set to high cluster priority, stocking strategy lever 446 is set to inherited from previous supply chain model, production rule lever 448 is set to MTS, and delivery strategy lever 1004 is set to inherited from previous supply chain model.

Figure 13:
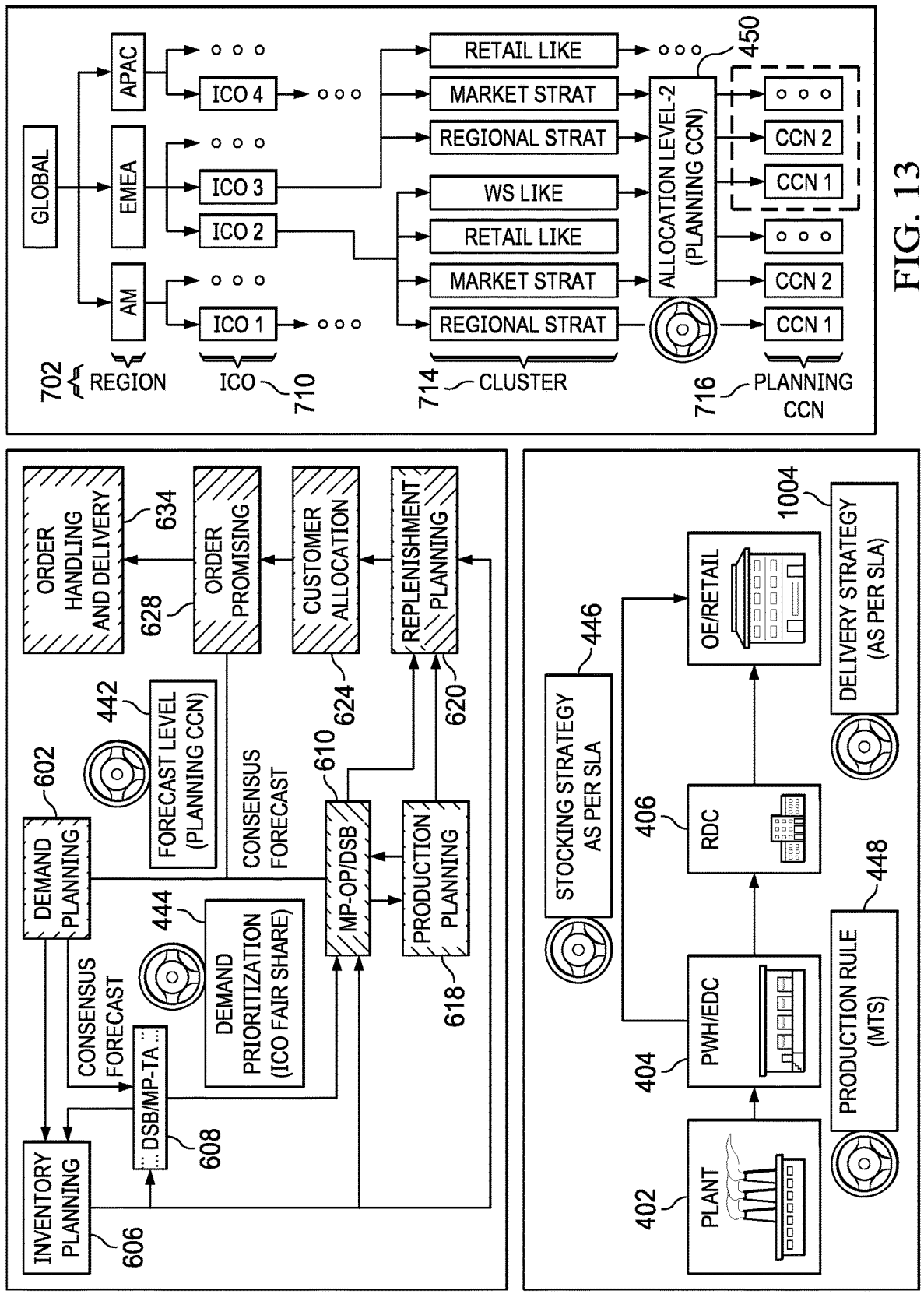
FIG. 13 illustrates configuration options for levers for a collaborative supply chain model, according to an embodiment.

FIG. 13 illustrates configuration options 508 for levers 504 for a collaborative supply chain model 1104, according to an embodiment. To configure the supply chain network 100 to enforce a collaborative supply chain model 1104, configuration options 508 for forecast lever 442 and allocation lever 450 are both set to planning CCN level 716 (e.g. customer level), demand prioritization lever 444 is set to ICO fair share, stocking strategy lever 446 is set to the strategy indicated in a service level agreement (SLA), production rule lever 448 is set to MTS, and delivery strategy lever 1004 is set to the strategy indicated in the SLA.

Figure 14:
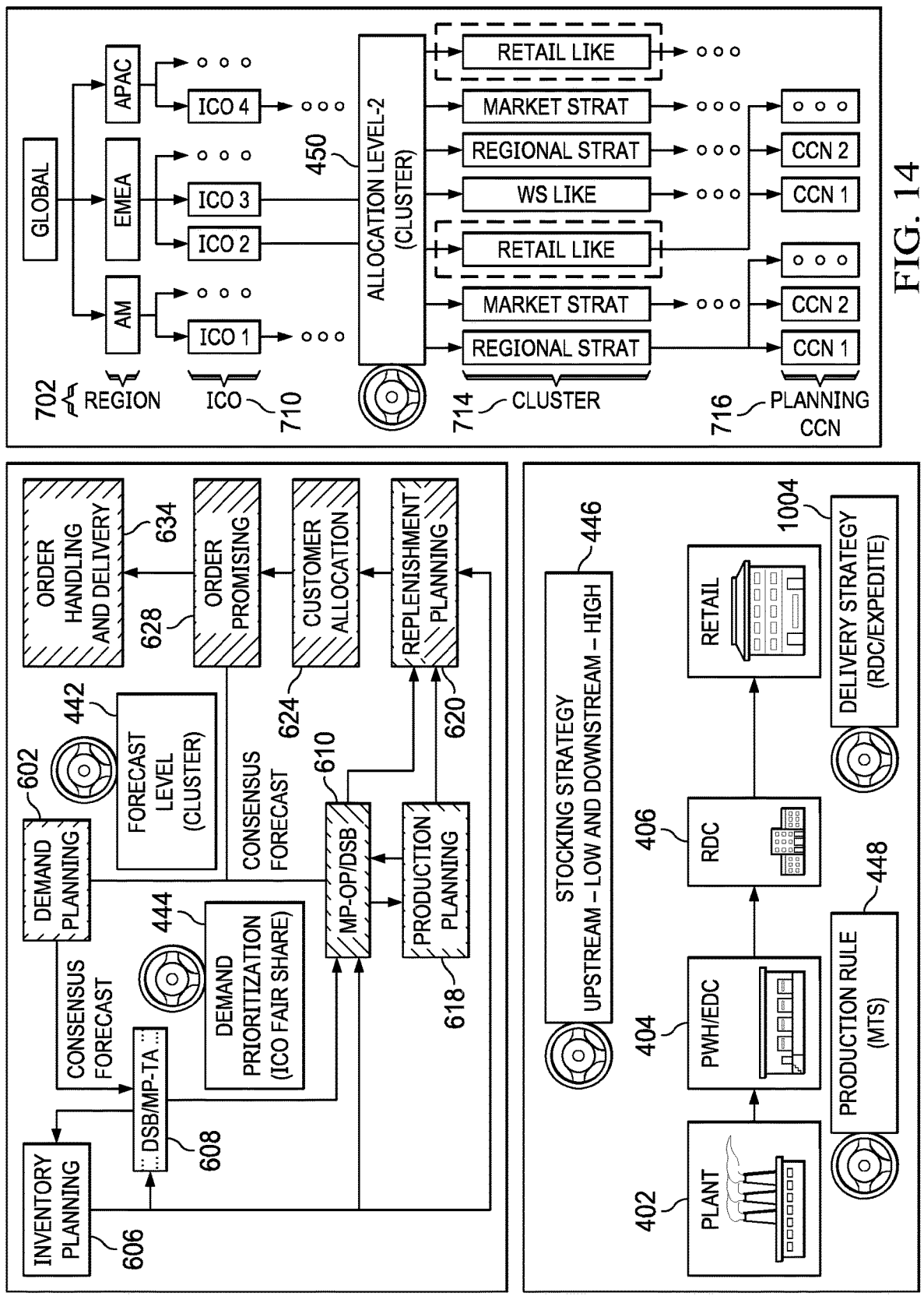
FIG. 14 illustrates configuration options for levers for an agile supply chain model, according to an embodiment.

FIG. 14 illustrates configuration options 508 for levers 504 for an agile supply chain model 1106, according to an embodiment. To configure the supply chain network 100 to enforce an agile supply chain model 1106, configuration options 508 for forecast lever 442 and allocation lever 450 are both set to cluster level 714, demand prioritization lever 444 is set to ICO fair share, stocking strategy lever 446 is set to upstream-low and downstream-high, production rule lever 448 is set to MTS, and delivery strategy lever 1004 is set to RDC/expedite.

Figure 15:
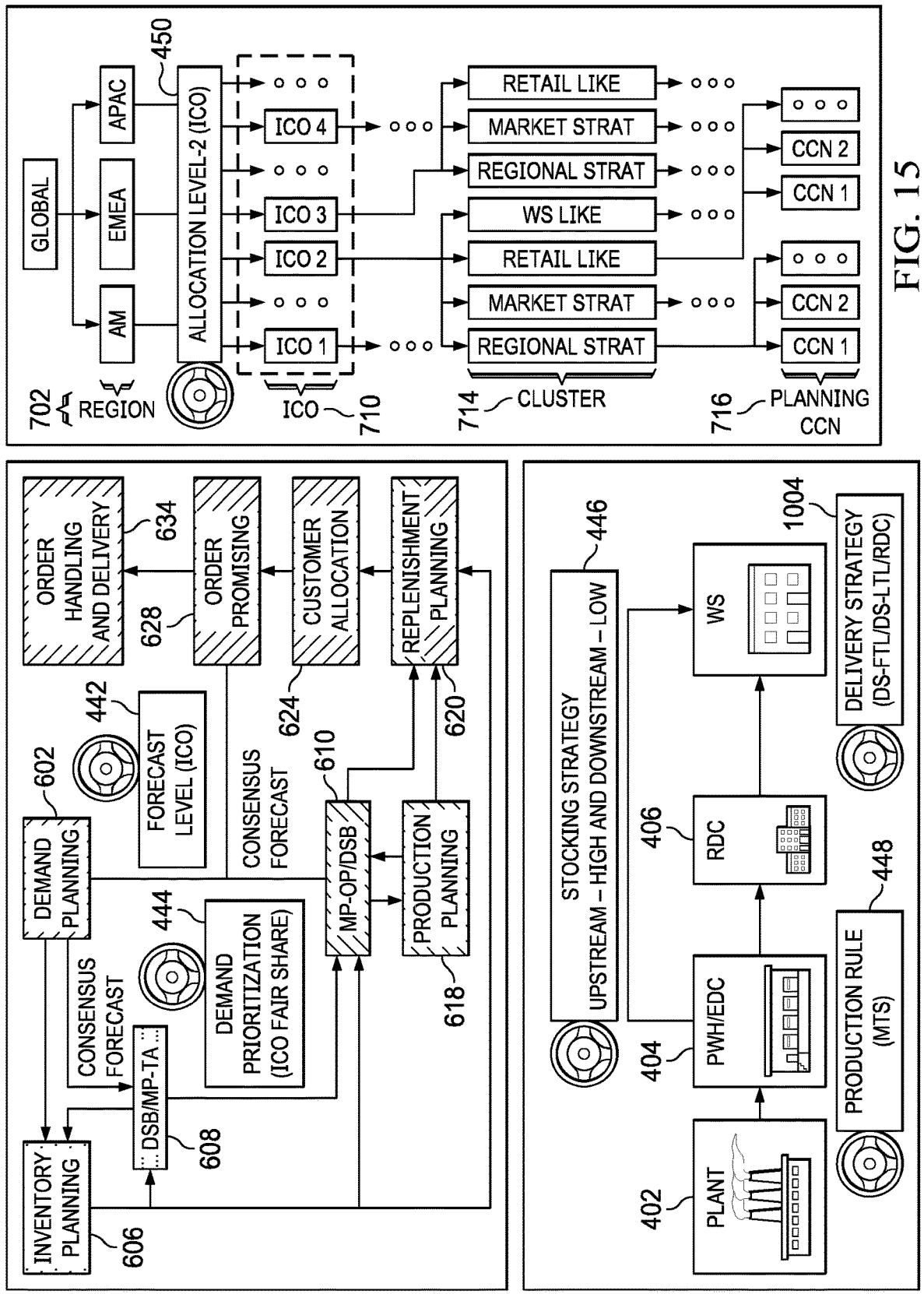
FIG. 15 illustrates configuration options for levers of a responsive supply chain model, according to an embodiment.

FIG. 15 illustrates configuration options 508 for levers 504 of a responsive supply chain model 1108, according to an embodiment. To configure the supply chain network 100 to enforce a responsive supply chain model 1108, configuration options 508 for forecast lever 442 and allocation lever 450 are both set to ICO level 710 (e.g. a market level), demand prioritization lever 444 is set to ICO fair share, stocking strategy lever 446 is set to upstream-high and downstream-low, production rule lever 448 is set to MTS, and delivery strategy lever 1004 is set to DS-FTL/DS-LTL/RDC.

Figure 16:
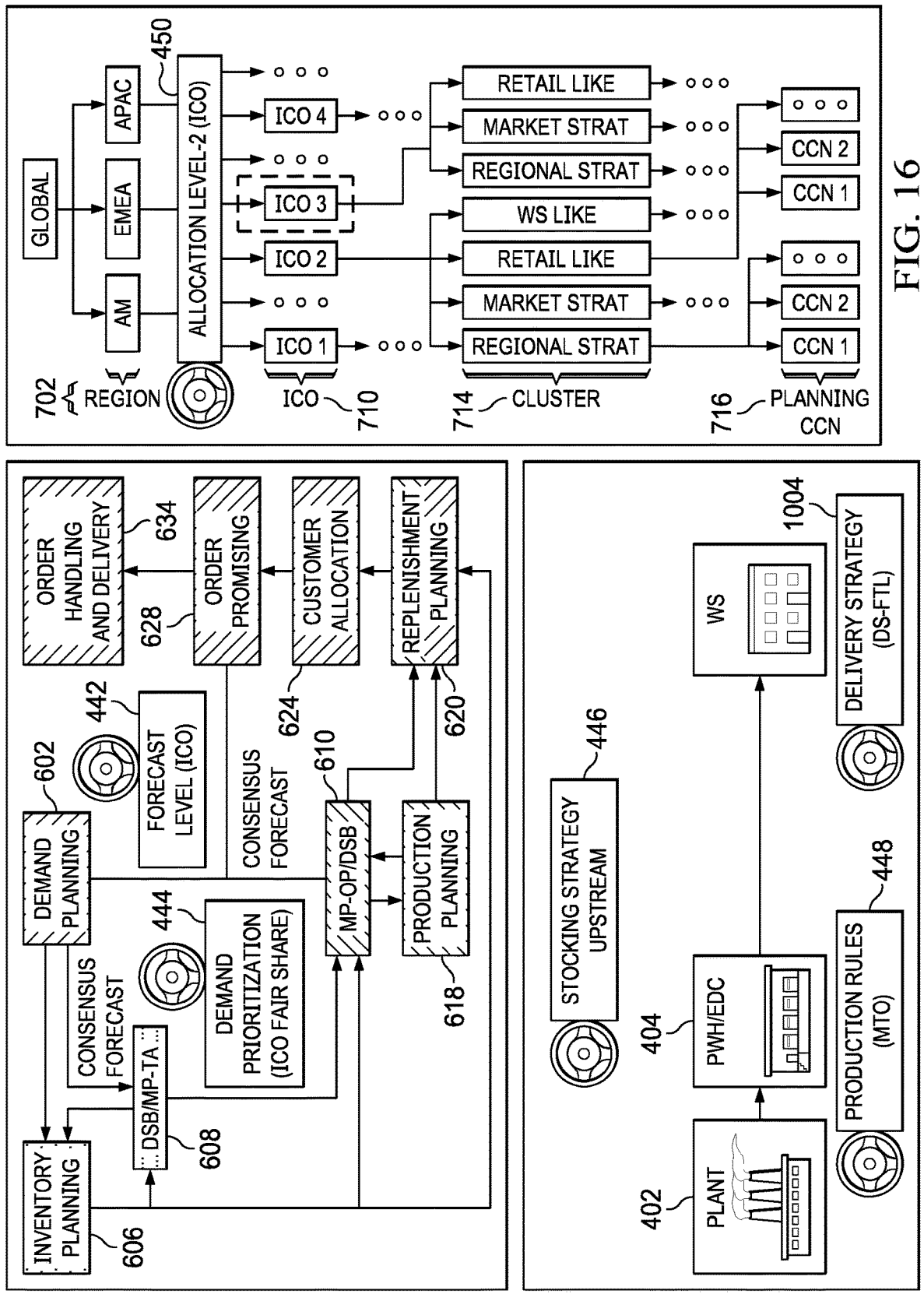
FIG. 16 illustrates configuration options for levers for an efficient supply chain model, according to an embodiment.

FIG. 16 illustrates configuration options 508 for levers 504 for an efficient supply chain model 1110, according to an embodiment. To configure the supply chain network 100 to enforce an efficient supply chain model 1110, configuration options 508 for forecast lever 442 and allocation lever 450 are both set to ICO level 710 (e.g. market level), demand prioritization lever 444 is set to ICO fair share, stocking strategy lever 446 is set to upstream, production rule lever 448 is set to MTO, and delivery strategy lever 1004 is set to DS-FTL.

As indicated in the above supply chain models 1102-1110, forecasting, allocation, and configuration options all work together to determine the services provided by supply chain network 100 for particular customers, products, or customer-product clusters.

FIG. 17 illustrates a chart 1700 detailing the relationship between supply chain strategies 502, levers 504, and supply chain strategy steering (central steering 706 and market steering 708). According to embodiments, levers 504 in supply chain network 100 may be configured at different locations of the supply chain network. For example, central steering 706 may comprise controlling various supply chain models 1102-1110 with configuration options 508 by a central planning organization, even though specific configuration of levers 504 may be left to market steering 708, as they do not impact the prioritization concept that may be part of segmentation design. Therefore, the central organization or the market may determine services to customers and alter the prioritization and availability of inventory. According to embodiments, a salesperson in a distant market, such as a country foreign to the company's headquarters, may configure the priority of customers in the distant market when the customers place orders, given the allocated inventory from the central organization. If left to the team at the central organization, allocation to this level of detail may be inefficient and provide incorrect prioritization.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for identifying supply chain segmentations from an initially non-segmented supply chain by a computer comprising a processor and a memory, comprising:
   receiving a current state of items in a supply chain network comprising one or more supply chain entities, wherein an inventory of the one or more supply chain entities is used to store one or more items, and a state of the items comprises a quantity and ordered flow among the inventory of the one or more supply chain entities;
   determining one or more customer-product clusters based on the size of the inventory and service expectations of the one or more supply chain entities, wherein the determining the one or more customer-product clusters is based at least in part on a Pareto analysis, wherein each customer-product cluster comprises a customer and product combination and wherein the one or more customer-product clusters are based, at least in part, on a hierarchy, and wherein the hierarchy is adjusted by defining a level of granularity between individual customers and aggregated customers;
   generating one or more levers associated with one or more supply chain strategies associated with the one or more customer-product clusters, each of the one or more levers comprising one or more configuration options, wherein the one or more levers are selected from the group consisting of: forecast level, stocking strategy, demand prioritization, production rule, ATP allocation and delivery strategy;
   assigning supply chain models to each of the customer-product clusters that meet requirements of the size of the inventory and service expectations of the one or more supply chain entities;
   determining an inventory policy based on targets of one or more principal key process indicators that is indicative of a projected service level for an item in the inventory for one or more successive inventory planning periods; and
   in response to determining the inventory policy, transporting items via robotic machinery among the one or more supply chain entities to restock the inventory of the one or more items according to the current state of items in the supply chain network.

2. The computer-implemented method of claim 1, further comprising:
   deriving a customer hierarchy comprising one or more levels and one or more priorities.

3. The computer-implemented method of claim 2, wherein the one or more priorities are based, at least in part, on the supply chain model and a user-selected priority value.

4. The computer-implemented method of claim 3, wherein the one or more configuration options are based, at least in part, on the one or more supply chain models.

5. The computer-implemented method of claim 4, further comprising:
   configuring supply chain processes with one or more enablers to enforce the supply chain models to one or more of customers, products, and the customer-product clusters.

6. A system of identifying supply chain segmentations from an initially non-segmented supply chain, comprising:
   a computer comprising a processor and a memory and configured to:
   receive a current state of items in a supply chain network comprising one or more supply chain entities, wherein an inventory of the one or more supply chain entities is used to store one or more items, and a state of the items comprises a quantity and ordered flow among the inventory of the one or more supply chain entities;
   determine one or more customer-product clusters based on the size of the inventory and service expectations of the one or more supply chain entities, wherein the determining the one or more customer-product clusters is based at least in part on a Pareto analysis, wherein each customer-product cluster comprises a customer and product combination and wherein the one or more customer-product clusters are based, at least in part, on a hierarchy, and wherein the hierarchy is adjusted by defining a level of granularity between individual customers and aggregated customers;
   generate one or more levers associated with one or more supply chain strategies associated with the one or more customer-product clusters, each of the one or more levers comprising one or more configuration options, wherein the one or more levers are selected from the group consisting of: forecast level, stocking strategy, demand prioritization, production rule, ATP allocation and delivery strategy;
   assign supply chain models to each of the customer-product clusters that meet requirements of the size of the inventory and service expectations of the one or more supply chain entities; and
   determine an inventory policy based on targets of one or more principal key process indicators that is indicative of a projected service level for an item in the inventory for one or more successive inventory planning periods; and
   robotic machinery that, in response to determining the inventory policy, transport items among the one or more supply chain entities to restock the inventory of the one or more items according to the current state of items in the supply chain network.

7. The system of claim 6, wherein the computer is further configured to:
   deriving a customer hierarchy comprising one or more levels and one or more priorities.

8. The system of claim 7, wherein the one or more priorities are based,
   at least in part, on the supply chain model and a user-selected priority value.

9. The system of claim 8, wherein the one or more configuration options are based, at least in part, on the one or more supply chain models.

10. The system of claim 9, wherein the computer is further configured to:
configure supply chain processes with one or more enablers to enforce the supply chain models to one or more of customers, products, and the customer-product clusters.

11. A non-transitory computer-readable medium embodied with software, the software when executed configured to identify supply chain segmentations from an initially non-segmented supply chain by:
receiving a current state of items in a supply chain network comprising one or more supply chain entities, wherein an inventory of the one or more supply chain entities is used to store one or more items, and a state of the items comprises a quantity and ordered flow among the inventory of the one or more supply chain entities;
determining one or more customer-product clusters based on the size of the inventory and service expectations of the one or more supply chain entities, wherein the determining the one or more customer-product clusters is based at least in part on a Pareto analysis, wherein each customer-product cluster comprises a customer and product combination and wherein the one or more customer-product clusters are based, at least in part, on a hierarchy, and wherein the hierarchy is adjusted by defining a level of granularity between individual customers and aggregated customers;
generating one or more levers associated with one or more supply chain strategies associated with the one or more customer-product clusters, each of the one or more levers comprising one or more configuration options, wherein the one or more levers are selected from the group consisting of: forecast level, stocking strategy, demand prioritization, production rule, ATP allocation and delivery strategy;
assigning supply chain models to each of the customer-product clusters that meet requirements of the size of the inventory and service expectations of the one or more supply chain entities;
determine an inventory policy based, at least in part, on targets of one or more principal key process indicators that is indicative of a projected service level for an item in the inventory for one or more successive inventory planning periods; and
in response to determining the inventory policy, directing robotic machinery to transport items among the one or more supply chain entities to restock the inventory of the one or more items according to the current state of items in the supply chain network.

12. The non-transitory computer-readable medium of claim 11, wherein the software when executed is further configured to:
derive a customer hierarchy comprising one or more levels and one or more priorities.

13. The non-transitory computer-readable medium of claim 12, wherein the one or more priorities are based, at least in part, on the supply chain model and a user-selected priority value.

14. The non-transitory computer-readable medium of claim 13, wherein the one or more configuration options are based, at least in part, on the one or more supply chain models.

* * * * *